(12) United States Patent
Sakamoto et al.

(10) Patent No.: US 12,386,578 B2
(45) Date of Patent: Aug. 12, 2025

(54) IMAGE DISPLAY DEVICE, IMAGE DISPLAY METHOD, AND STORAGE MEDIUM STORING COMPUTER PROGRAM FOR EXECUTING IMAGE DISPLAY METHOD

(71) Applicant: Panasonic Intellectual Property Management Co., Ltd., Osaka (JP)

(72) Inventors: Takeshi Sakamoto, Osaka (JP); Tomonori Yoshida, Osaka (JP); Tomomitsu Masuda, Osaka (JP); Junya Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 82 days.

(21) Appl. No.: 17/977,284

(22) Filed: Oct. 31, 2022

(65) Prior Publication Data
US 2023/0236788 A1 Jul. 27, 2023

(30) Foreign Application Priority Data
Jan. 25, 2022 (JP) ................. 2022-009689

(51) Int. Cl.
*G09G 5/02* (2006.01)
*G06F 3/14* (2006.01)
(Continued)

(52) U.S. Cl.
CPC ............ *G06F 3/1454* (2013.01); *G06T 11/60* (2013.01); *G09G 5/006* (2013.01); *G09G 2320/0276* (2013.01); *G09G 2320/066* (2013.01); *G09G 2320/0666* (2013.01); *G09G 2370/042* (2013.01); *G09G 2370/12* (2013.01)

(58) Field of Classification Search
CPC .... G09G 5/02; G09G 5/06; G09G 2320/0666; G09G 2340/06; G09G 3/20; G09G 2320/0626; G09G 2360/144; G09G 2360/16; G09T 11/001; G06F 2200/1614; G06F 2200/1637; G06T 11/001;
(Continued)

(56) References Cited

U.S. PATENT DOCUMENTS

| 2009/0135304 A1 | 5/2009 | Inoue et al. |
| 2013/0128117 A1 | 5/2013 | Ishii |

(Continued)

FOREIGN PATENT DOCUMENTS

| JP | 2008-153991 | 7/2008 |
| JP | 2009-122552 | 6/2009 |
| JP | 2013-109026 | 6/2013 |

*Primary Examiner* — Gordon G Liu
(74) *Attorney, Agent, or Firm* — Wenderoth, Lind & Ponack, L.L.P.

(57) ABSTRACT

The image display device includes an input unit that receives image data, a display unit that displays the image data received by the input unit, a receiving unit that receives drawing data drawn on the image data displayed on the display unit, an output unit that outputs the image data to another device, and a computing unit. The computing unit performs specific image adjustment on the image data, and causes the display unit to display the image data without performing the specific image adjustment on the image data when the specific image adjustment has been performed on the image data received by the input unit.

9 Claims, 20 Drawing Sheets

(51) Int. Cl.
*G06T 11/60* (2006.01)
*G09G 5/00* (2006.01)

(58) Field of Classification Search
CPC .......... G06T 11/20; G06T 11/40; G06T 11/60; G06T 11/00
USPC ........................................................ 345/589
See application file for complete search history.

(56) References Cited

U.S. PATENT DOCUMENTS

| | | | |
|---|---|---|---|
| 2017/0064385 A1* | 3/2017 | Nakajima | H04N 21/4402 |
| 2018/0270448 A1* | 9/2018 | Onuma | H04N 7/18 |
| 2019/0110031 A1* | 4/2019 | Toyoda | H04N 9/3194 |
| 2019/0228744 A1* | 7/2019 | Kondo | H04N 5/14 |
| 2020/0372852 A1* | 11/2020 | Ishiwata | G09G 3/2096 |

* cited by examiner

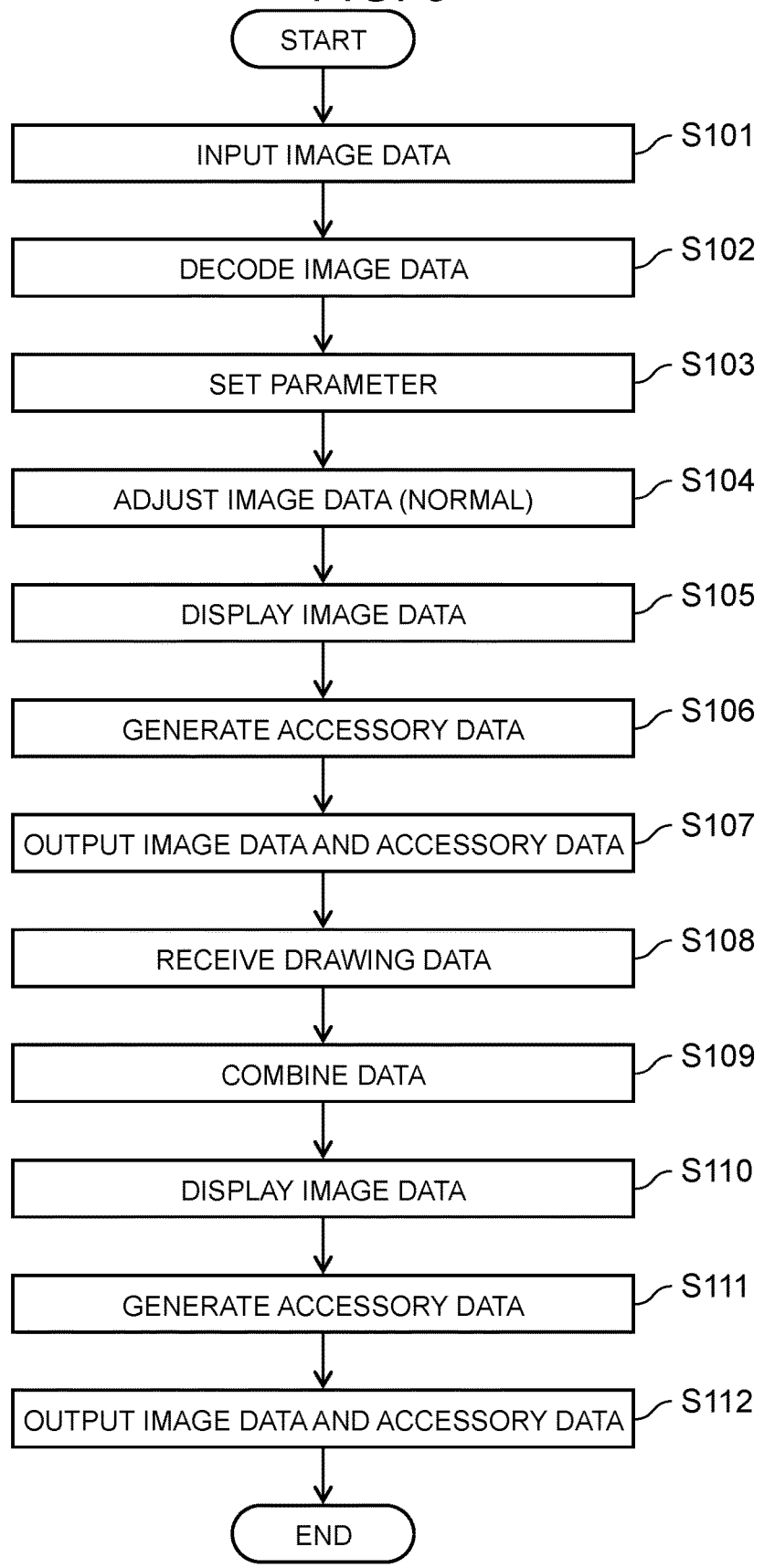

IMAGE DISPLAY DEVICE, IMAGE DISPLAY METHOD, AND STORAGE MEDIUM STORING COMPUTER PROGRAM FOR EXECUTING IMAGE DISPLAY METHOD

BACKGROUND

1. Technical Field

The present disclosure relates to an image display device, an image display method, and a computer program that can be used in an image display system to which a plurality of image display devices are connected.

2. Description of the Related Art

In recent years, the image display devices such as digital displays and electronic blackboards have become widespread in educational sites such as schools. For example, in a case where such an image display device is used in a classroom or the like of a school, a main image display device is generally disposed in front of a room. When the image display device is disposed only in front of the room, for a person who sits in the rear of the room and attends a class or the like, information displayed on the image display device may be small and may not be visually recognized. Therefore, it is conceivable to arrange a sub image display device that displays the same image data as the main image display device at a position that is easily visible to a person sitting in the rear of the room.

Patent Literature (PTL) 1 describes an in-vehicle system as an example in which a plurality of video display devices are arranged in the same space. The system described in PTL 1 is intended to contribute to improvement in image quality of videos displayed on the plurality of video display devices.

PTL 1: Unexamined Japanese Patent Publication No. 2008-153991

SUMMARY

However, the system described in PTL 1 simply displays a video signal provided from a video providing device as it is. On the other hand, in the image display device displayed at school, there is a case where writing is performed on a display of the main image display device, and it is desired to display image data including the writing also on the sub image display device. In such a case, it is preferable that the same image data can be easily displayed on a plurality of image display devices without requiring bothersome image adjustment operation in each of the image display devices.

The present disclosure provides an image display device, an image display method, and a computer program that easily displays the same image data on a plurality of image display devices.

The image display device of the present disclosure includes an input unit that receives image data, a display unit that displays the image data received by the input unit, a receiving unit that receives drawing data drawn on the image data displayed on the display unit, an output unit that outputs the image data to another device, and a computing unit. The computing unit performs specific image adjustment on the image data, and causes the display unit to display the image data without performing the specific image adjustment on the image data when the specific image adjustment has been performed on the image data received by the input unit.

These general and specific aspects may be achieved by a system, a method, and a computer program, and any combination of these.

The image display device, the image display method, and the computer program of the present disclosure can easily display the same image data on the plurality of image display devices.

BRIEF DESCRIPTION OF THE DRAWINGS

FIG. 8 is a flowchart illustrating image display processing in a first image display device according to the first exemplary embodiment;

DETAILED DESCRIPTIONS

Figure 1A:
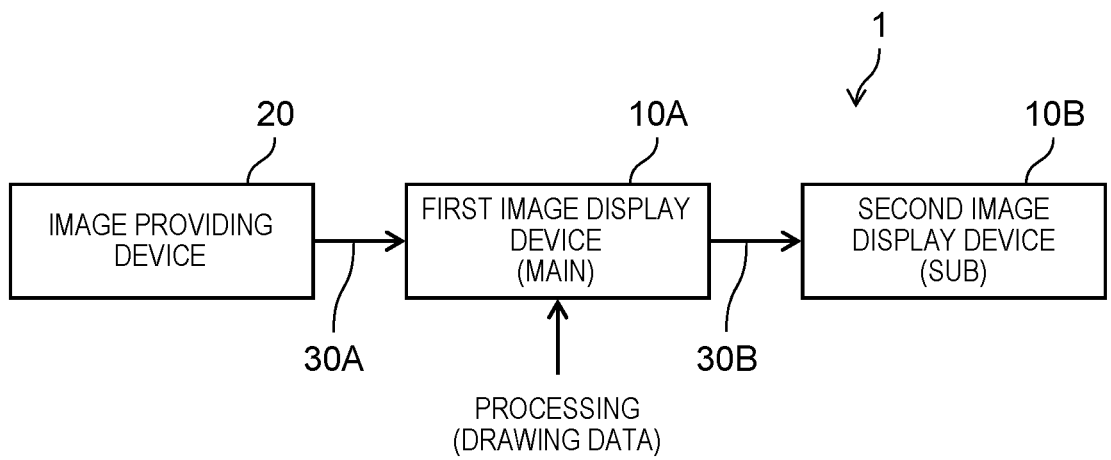
FIG. 1A is a block diagram illustrating an image display system according to a first exemplary embodiment.

As illustrated in FIG. 1A, image display system 1 according to the present disclosure includes a plurality of image display devices (first and second image display devices 10A, 10B). First and second image display devices 10A, 10B display the same image data provided by image providing device 20. At this time, in image display system 1, processing, specifically, writing of symbols, characters, illustrations, or the like on the image data can be performed in first image display device 10A that is a main device. Then, second image display device 10B that is a sub device displays the image data in which written information (drawing data) is combined. For example, in a case where image display system 1 is used as an electronic blackboard in school or the like, information written by a teacher in first image display device 10A can be displayed on second image display device 10B in a subsequent stage, and can be easily viewed by all students in a classroom. Hereinafter, an image display device in which symbols, characters, and the like can be written will be described as the main device, and an image display device in which the symbols and the like cannot be written will be described as the sub device. Note that, in FIG. 1A, an image display device is not connected to a subsequent stage of second image display device 10B that is the sub device, but a plurality of sub image display devices capable of displaying image data input from the image display device of in a preceding stage may be further included. That is, the number of sub image display devices included in image display system 1 is not limited.

Generally, in the image display device, when the image data is displayed, image adjustment is performed according to the image data and characteristics peculiar to the device, such as brightness, contrast, sharpness, gamma correction, black expansion, and white balance. However, in image display system 1 illustrated in FIG. 1A, the image data such as brightness and contrast is adjusted in first image display device 10A before writing, specifically, before combining the drawing data. Therefore, in image display system 1 in which the plurality of image display devices are arranged in series as illustrated in FIG. 1A, when the image data is adjusted in first image display device 10A in the preceding stage and the image is subsequently adjusted also in second image display device 10B in the subsequent stage, the image data displayed on second image display device 10B will be image data that has been subjected to the image adjustment multiple times, which may result in an undesirable state.

Figure 1B:
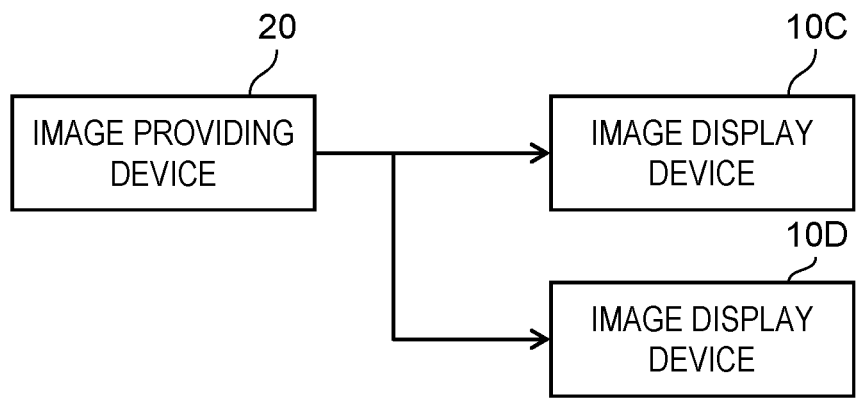
FIG. 1B is a block diagram illustrating another image display system compared with the image display system of FIG. 1A.

If the image data is not processed, as illustrated in FIG. 1B, the image data may be provided to a plurality of image display devices 10C, 10D connected in parallel to image providing device 20. However, in a parallel connection method as illustrated in FIG. 1B, image data processed by one image display device 10C cannot be displayed on another image display device 10D as well.

Therefore, in image display system 1 according to the present disclosure, an adverse effect on the image caused by the image adjustment by first and second image display devices 10A, 10B is prevented.

Exemplary embodiments of the present disclosure will be described below with reference to the drawings. However, unnecessary parts in description regarding the related art and substantially identical configurations may be omitted in detailed descriptions. This is to simplify the description. Further, the following description and the accompanying drawings are provided to help those skilled in the art to fully understand the present disclosure and are not intended to limit the subject matter of the claims.

First Exemplary Embodiment

In image display system 1 according to the first exemplary embodiment, as described above with reference to FIG. 1A, image providing device 20 and first image display device 10A are connected, and first image display device 10A and second image display device 10B are connected. For example, image providing device 20 and first image display device 10A are connected via HDMI (registered trademark) cable 30A. Further, first image display device 10A and second image display device 10B are also connected by HDMI cable 30B. Image providing device 20 and first image display device 10A can respectively transmit data including a video signal, an audio signal, and a control signal to first image display device 10A and second image display device 10B in the subsequent stage by high-definition multimedia interface (HDMI) connection.

Figure 2:
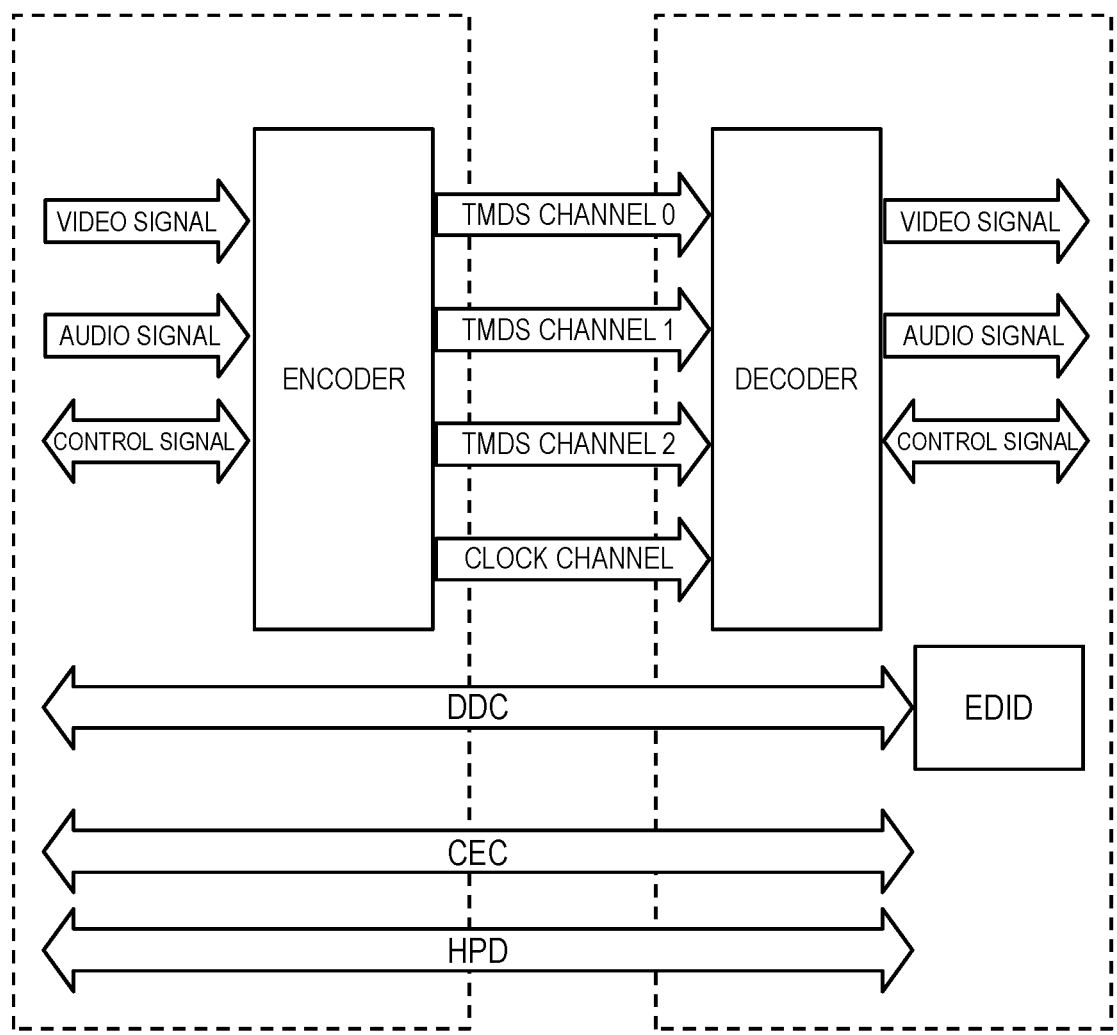
FIG. 2 is a conceptual diagram illustrating an HDMI connection used in the image display system of FIG. 1A.

Specifically, as illustrated in an example in FIG. 2, in the HDMI connection, the video signal, the audio signal, and the control signal encoded by an encoder of the device in the preceding stage are transmitted to the device in the subsequent stage via a channel line, and are decoded and used by a decoder of the device in the subsequent stage. The HDMI connection includes a DDC line, a CEC line, and an HPD line in addition to the channel line used for communication of each signal and a clock signal. The DDC line is used by the device in the subsequent stage to transmit information of its own device to the device in the preceding stage.

Figure 3:
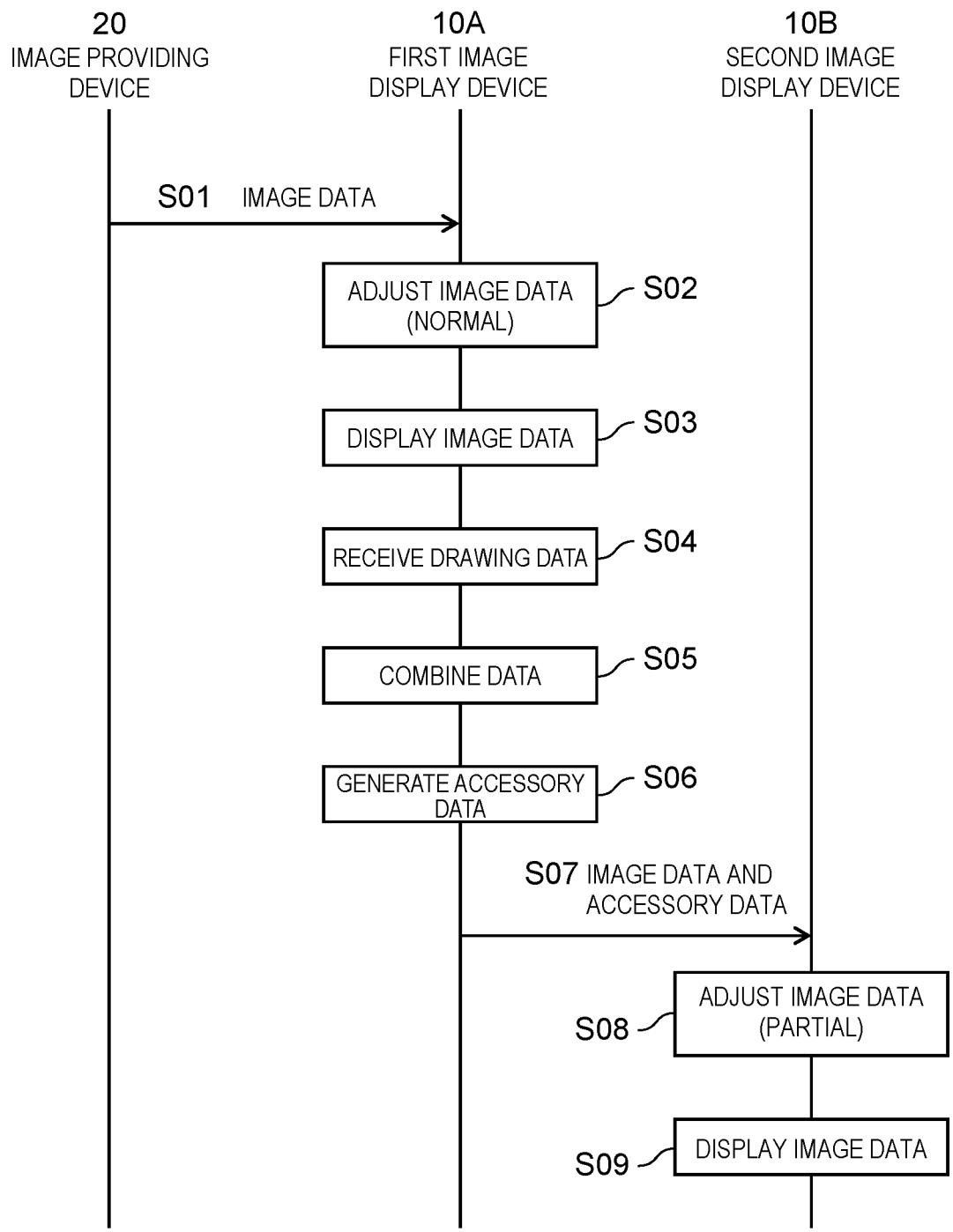
FIG. 3 is a sequence diagram illustrating processing in the image display system according to the first exemplary embodiment.

As illustrated in a sequence diagram of FIG. 3, image providing device 20 provides the image data to first image display device 10A (S01). First image display device 10A adjusts brightness, contrast, or the like of the image data received from image providing device 20 (S02), and displays the image data on a display (S03). Further, when first image display device 10A receives the drawing data such as writing to the image data from a user (S04), first image display device 10A combines the image data subjected to the image adjustment in step S02 with the drawing data received in step S04 (S05). First image display device 10A generates accessory data including the information of its own device and image adjustment information (S06), adds the accessory data to the image data, and transmits the image data to second image display device 10B (S07). Second image display device 10B performs the image adjustment in its own device according to the image adjustment in first image display device 10A (S08), and displays the image on the display (S09). Thus, in image display system 1 according to the first exemplary embodiment, it is possible to prevent the adverse effect on the image caused by repeated image adjustment in the second image display device 10B.

<<Image Providing Device>>

For example, image providing device 20 reads image data stored in an internal storage medium or obtains image data from an external storage medium, and provides the image data to first image display device 10A. For example, image providing device 20 may be a personal computer. Further, for example, image providing device 20 may be an image reproduction device such as a DVD player or a game device. Note that the "image" is not necessarily a still image, and may be a moving image. Furthermore, the "image" may be a video in which the moving image and audio are combined. Here, in order to simplify the description, a still image is taken as an example of the "image", and the audio is also omitted.

<<Image Display Device>>

Figure 4:
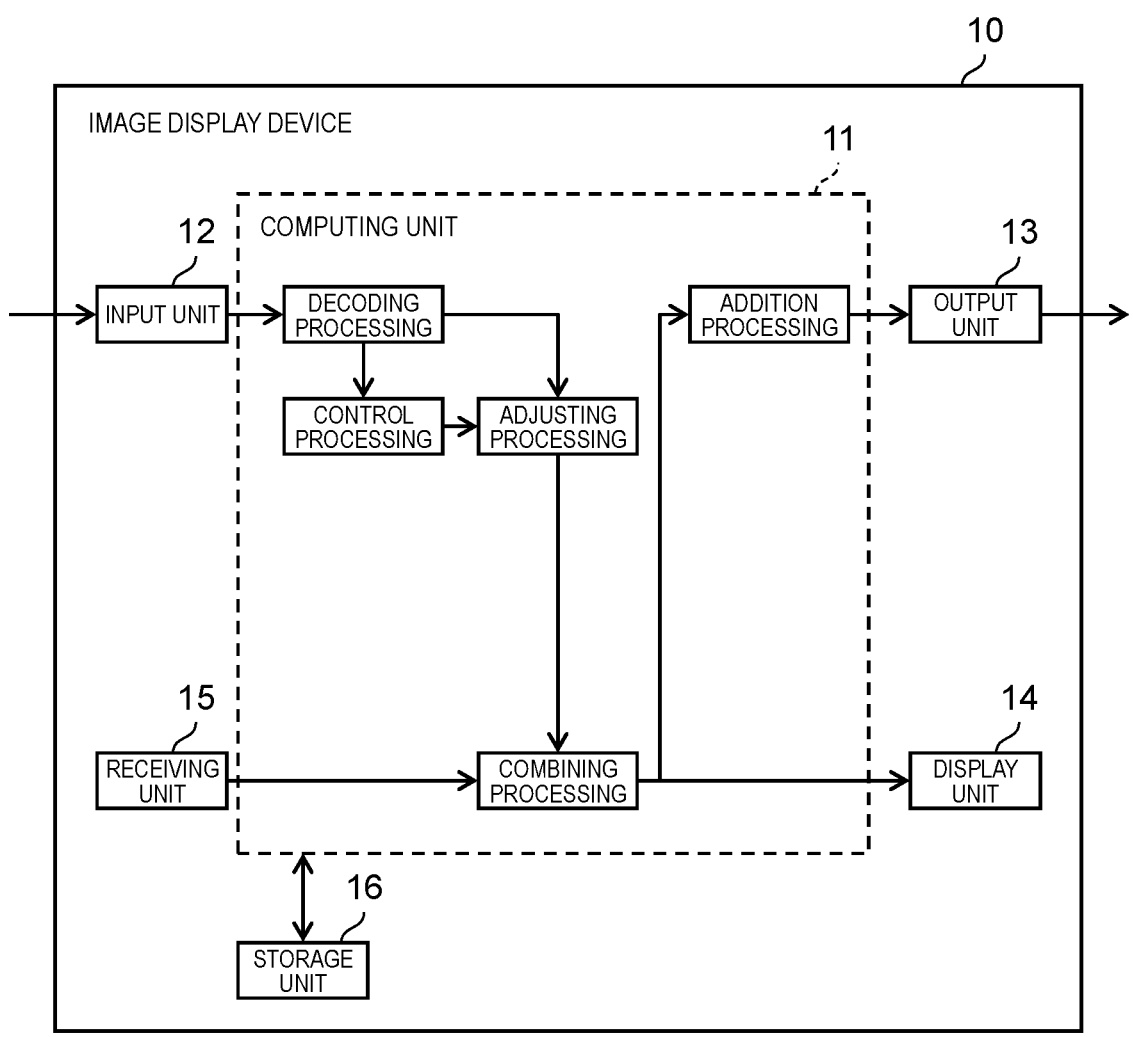
FIG. 4 is a block diagram illustrating a configuration of an image display device according to the first exemplary embodiment.

Since first and second image display devices 10A, 10B have the same configuration, they will be described below as image display device 10 when no distinction is necessary. As illustrated in FIG. 4, image display device 10 according to the first exemplary embodiment includes computing unit 11, input unit 12, output unit 13, display unit 14, receiving unit 15, and storage unit 16.

Computing unit 11 is a controller that controls image display device 10 as a whole. For example, computing unit 11 implements processing such as decoding processing, control processing, adjusting processing, combining processing, and addition processing for performing image display. Further, computing unit 11 is not limited to one that implements a predetermined function through cooperation of hardware and software, and may be a hardware circuit designed exclusively for implementing the predetermined function. That is, computing unit 11 can be implemented by various processors such as a CPU, an MPU, a GPU, an FPGA, a DSP, and an ASIC.

Input unit 12 is an interface used for inputting the image data. Specifically, input unit 12 is an input terminal used for inputting an HDMI signal. Output unit 13 is an interface used for outputting the image data. Specifically, output unit 13 is an output terminal used for outputting the HDMI signal.

Display unit 14 is a device that displays the image data. Note that, although not illustrated in FIG. 4, image display device 10 includes a speaker that outputs audio data together with the image data to be displayed on display unit 14 when the image data is video data including audio data.

Receiving unit 15 is an input unit such as a touch screen that receives the drawing data including symbols, characters, illustrations, or the like written on the image data by the user. For example, in a case where the user desires to emphasize a specific portion of the image data displayed on display unit 14, the user can touch the touch screen with a tool such as a dedicated pen prepared in advance or user's own fingertip to mark the touch screen. Further, receiving unit 15 may receive an operation signal from the user for image display device 10 in addition to being used to receive the drawing data.

The image data (that is, the combined image data in which the drawing data is combined) updated using the drawing data received by receiving unit 15 is displayed on the own device, and is transmitted only to image display device 10 connected as the subsequent stage, but is not transmitted to image display device 10 connected as the preceding stage. If three image display devices 10 are connected, the drawing data received by receiving unit 15 of a first image display device is displayed on the first, second, and third image display devices. However, the drawing data received by receiving unit 15 of the second image display device is displayed only on the second and third image display devices, and the drawing data received by receiving unit 15 of the third image display device is displayed only on the third image display device.

Storage unit 16 is a storage medium that stores various kinds of information. Storage unit 16 is implemented by, for example, a RAM, a ROM, a flash memory, an SSD, a hard disk drive, other storage devices, or an appropriate combination thereof. Storage unit 16 stores a computer program executed by computing unit 11, various data used for performing image display, and the like.

In the decoding processing, computing unit 11 decodes the image data input to input unit 12. Specifically, computing unit 11 decodes the accessory data input together with the image data. More specifically, computing unit 11 decodes information of a device that has transmitted the image data and information of the image adjustment performed on the image data. For example, computing unit 11 determines whether the image data is transmitted from a device of a predetermined type as decoding of the information of the device that has transmitted the image data. In addition, computing unit 11 obtains, for example, an item of the image adjustment performed on the image data and a parameter value adjusted for each item from the accessory data as decoding of how the image adjustment has been performed.

In the control processing, computing unit 11 sets a parameter value for adjusting the image according to a result of the decoding processing, and controls the adjusting processing in the subsequent stage. For example, when the image data is not one transmitted from a predetermined type of image display device, computing unit 11 sets each parameter value for adjusting the image so that image display device 10 provides an optimum display. Specifically, computing unit 11 can set parameter values for adjustment for all items of brightness, contrast, sharpness, gamma correction, black expansion, and white balance. On the other hand, when the image data is one transmitted after the image adjustment in the predetermined type of image display device, computing unit 11 sets each parameter value so that the image adjustment does not overlap for an item for which the image adjustment has been performed. Here, the "predetermined type" is a predetermined type such as the same or similar standard or series that can configure image display system 1 with first image display device 10A as the main or second image display device 10B as the sub.

Specifically, when brightness, contrast, sharpness, gamma correction, and black expansion of the image data has been adjusted in the image display device in the preceding stage, computing unit 11 does not adjust brightness, contrast, sharpness, gamma correction, and black expansion. Specifically, computing unit 11 sets a parameter value with an offset of 0 for brightness. Further, computing unit 11 sets a parameter value with a gain of 100% for contrast and black expansion. Further, for sharpness and gamma correction, parameter values for turning off the adjustment are set. Furthermore, regarding white balance, since a unique parameter value is determined for each device, when the white balance of the image data has been adjusted in the image display device in the preceding stage, computing unit 11 determines a parameter value in the own device in consideration of a parameter value regarding the white balance adjusted in the image display device in the preceding stage.

For example, assume that color temperature is 9300K in first image display device 10A, and for each of RGB gains, S_R_Gain is 242, S_G_Gain is 255, and S_B_Gain is 239. Further, assume that color temperature is 9300K in second image display device 10B, and for each of RGB gains, R_R_Gain is 255, R_G_Gain is 233, and R_B_Gain is 217. At this time, since it is determined that R_R_Gain is maximum from magnitudes of values of the RGB gains, the maximum is set to "255", and setting values WR, WG, and WB of the white balance in second image display device 10B that is a final reception side for red (R), green (G), and blue (B) are respectively determined to be 255, 211, and 220 using equations (1) to (3).

$$WR = (S\_R\_Gain/S\_R\_Gain) \times R\_R\_Gain = (242/242) \times 255 = 255 \quad (1)$$

$$WG = (S\_R\_Gain/S\_G\_Gain) \times R\_G\_Ggain = (242/255) \times 233 = 221 \quad (2)$$

$$WB = (S\_R\_Gain/S\_B\_Gain) \times R\_B\_Ggain = (242/239) \times 217 = 220 \quad (3)$$

Figure 5A:
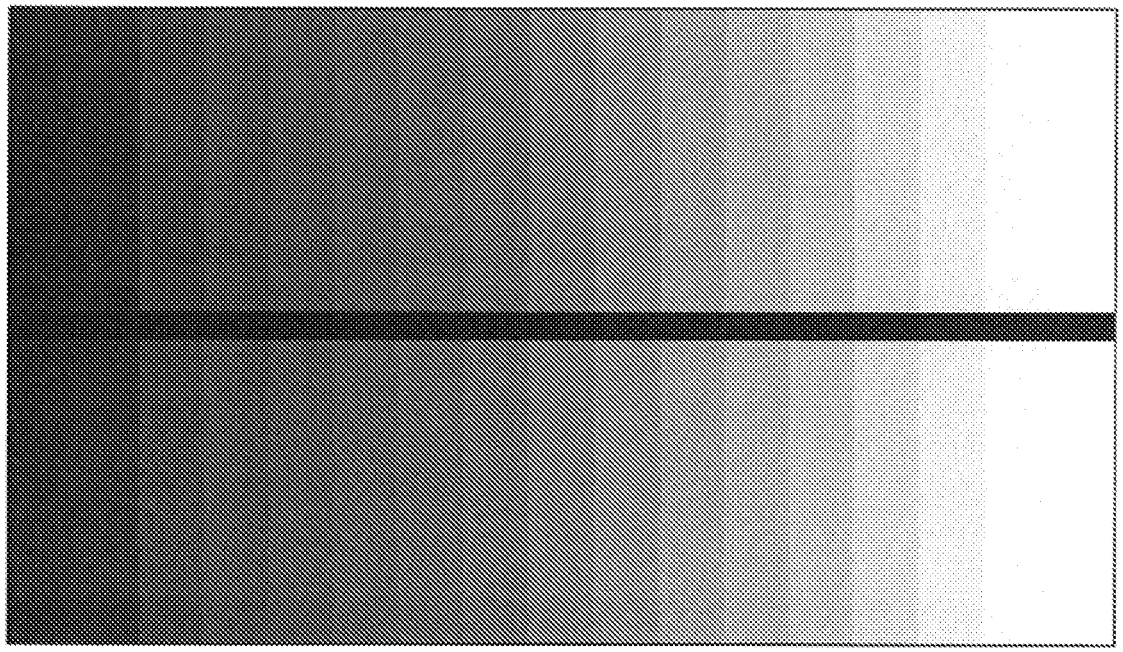
FIG. 5A is an image example for explaining brightness adjustment in the image display device.
Figure 5B:
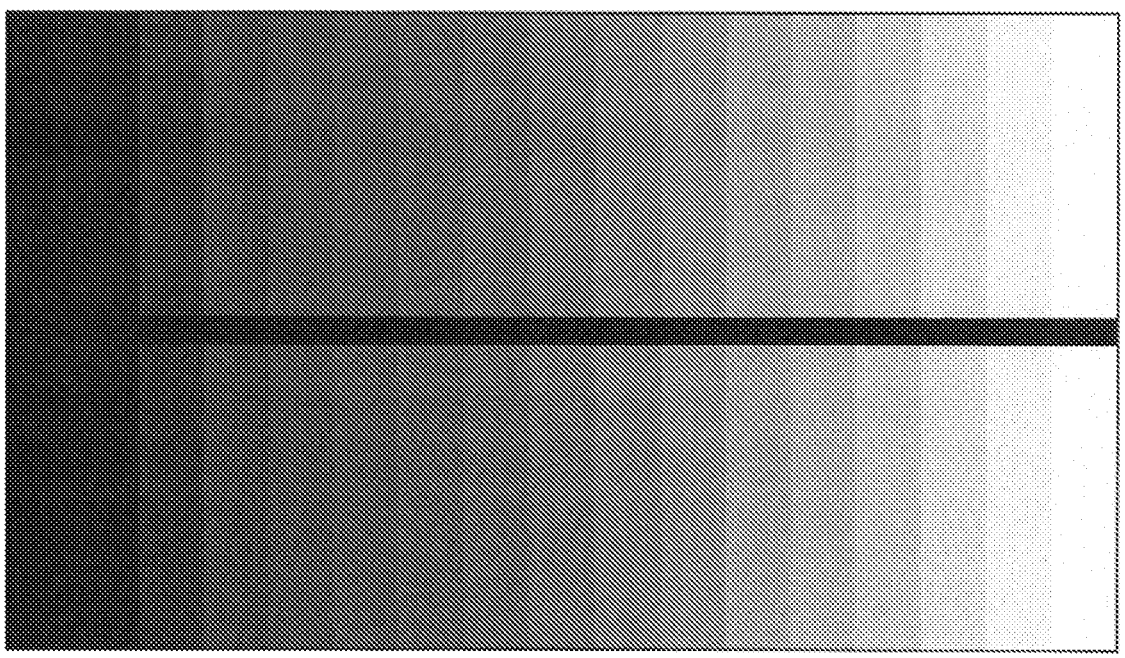
FIG. 5B is an image example for explaining brightness adjustment in the image display device subsequent to FIG. 5A.
Figure 5C:
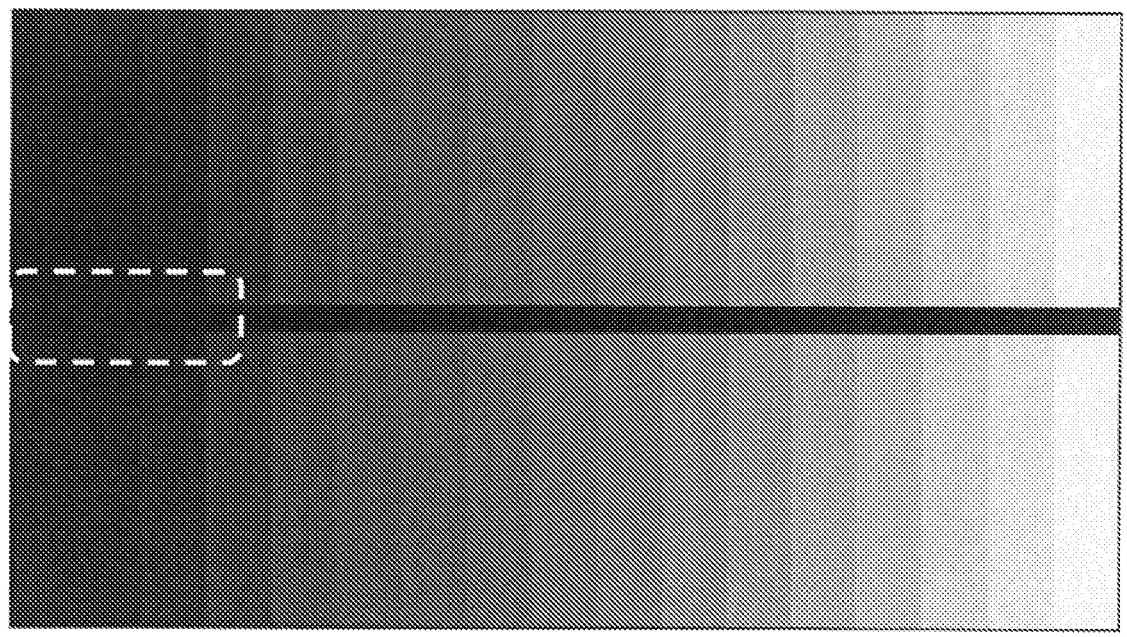
FIG. 5C is an image example for explaining brightness adjustment in the image display device subsequent to FIG. 5B.

An image illustrated in FIG. 5B is an example in which adjustment to reduce brightness of an image illustrated in FIG. 5A by 5% is performed. Further, an image illustrated in FIG. 5C is an example in which adjustment to further reduce the brightness of the image illustrated in FIG. 5B by 5% is performed. As described above, in a case where the brightness is adjusted a plurality of times, as illustrated in a broken line region of FIG. 5C, a so-called blocked up shadows state occurs in which a gradation difference of a dark portion is lost, the dark portion becomes black, and gradation of the dark portion cannot be distinguished. Therefore, in computing unit 11, when the brightness adjustment has been performed in the image display device in the preceding stage, by limiting the brightness adjustment, it is possible to prevent the image from deteriorating due to occurrence of the blocked up shadows state.

Figure 6A:
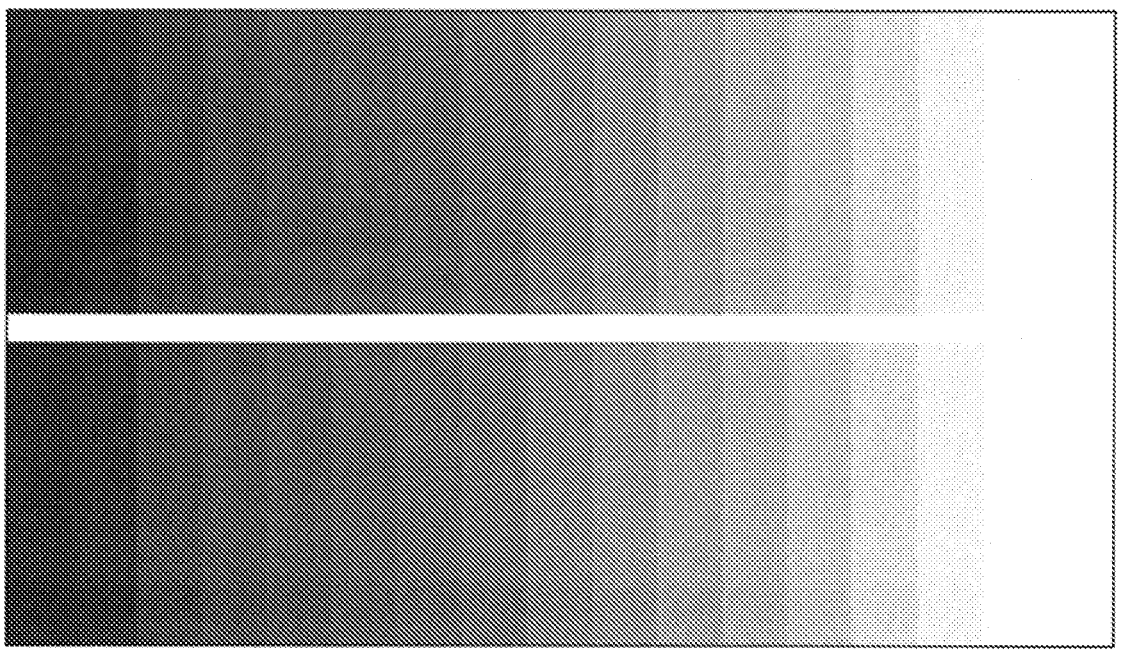
FIG. 6A is an image example for explaining contrast adjustment in the image display device.
Figure 6B:
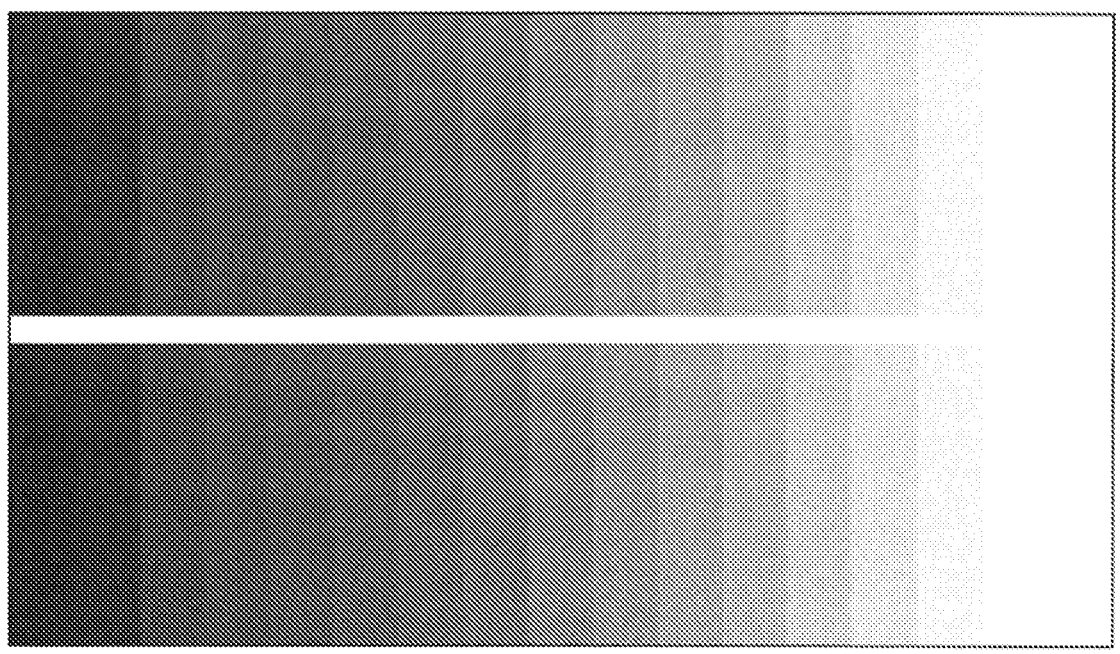
FIG. 6B is an image example for explaining contrast adjustment in the image display device subsequent to FIG. 6A.
Figure 6C:
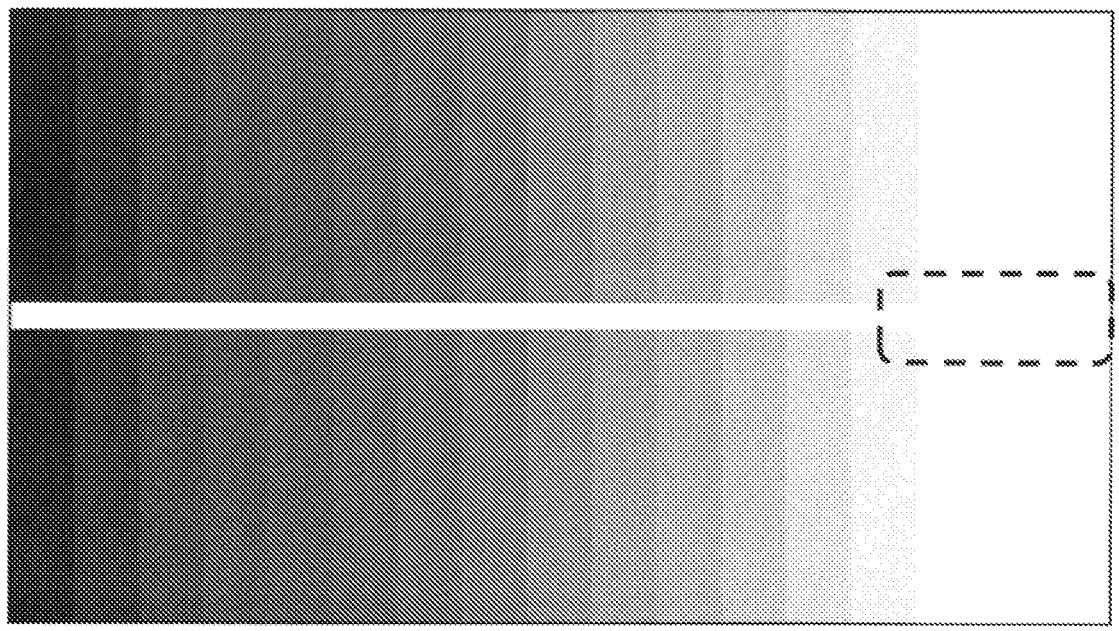
FIG. 6C is an image example for explaining contrast adjustment in the image display device subsequent to FIG. 6B.

An image illustrated in FIG. 6B is an example in which adjustment to increase brightness of an image illustrated in FIG. 6A by 5% is performed to be amplified to 105%. Further, an image illustrated in FIG. 6C is an example in which adjustment to further increase the brightness of the image illustrated in FIG. 6B by 5% is performed. As described above, in a case where the brightness is adjusted a plurality of times, as illustrated in a broken line region of FIG. 6C, a so-called blown out highlights state occurs in which a gradation difference of a bright portion is lost, the bright portion becomes white, and gradation of the bright portion cannot be distinguished. Therefore, in computing unit 11, for a high-brightness image whose contrast has been adjusted by the image display device in the preceding stage, by limiting contrast adjustment, it is possible to prevent the image from deteriorating due to occurrence of the blown out highlights state.

Figure 7A:
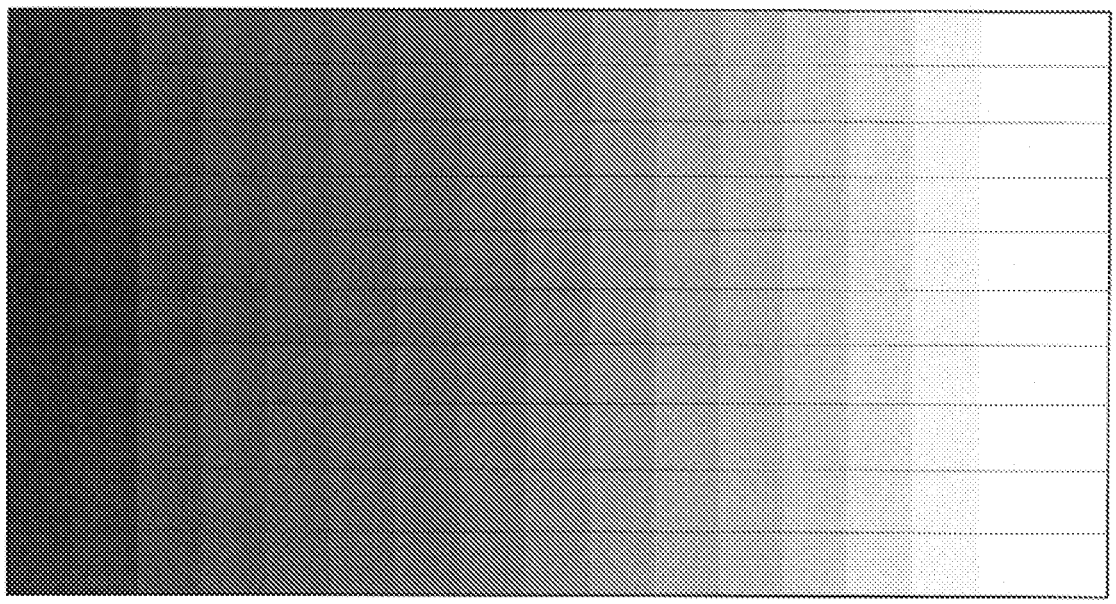
FIG. 7A is an image example for explaining sharpness adjustment in the image display device.
Figure 7B:
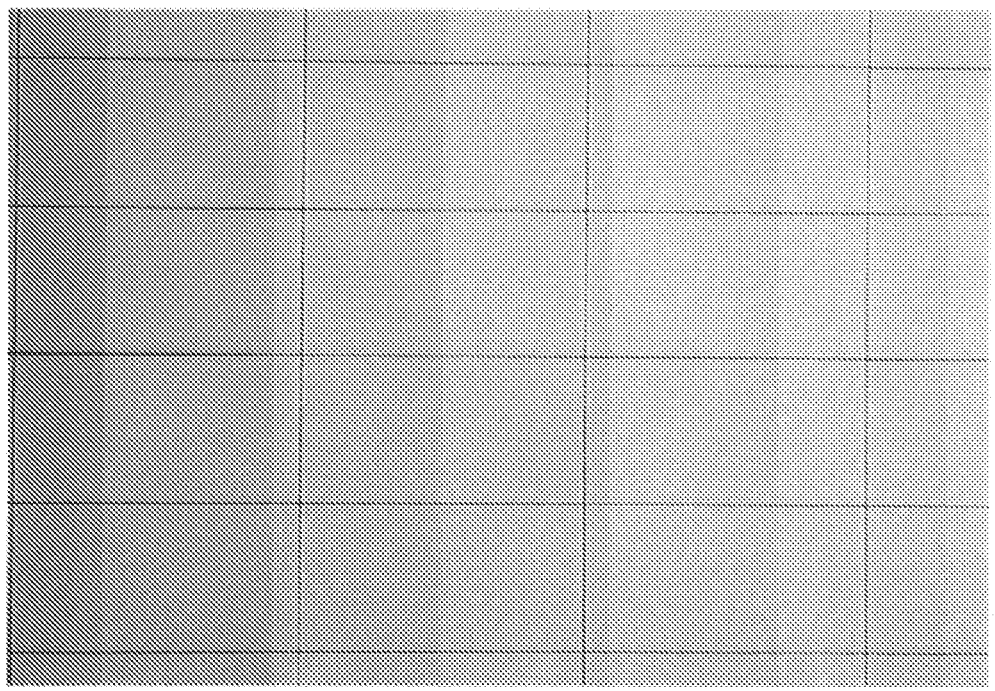
FIG. 7B is an image example for explaining sharpness adjustment in the image display device subsequent to FIG. 7A.
Figure 7C:
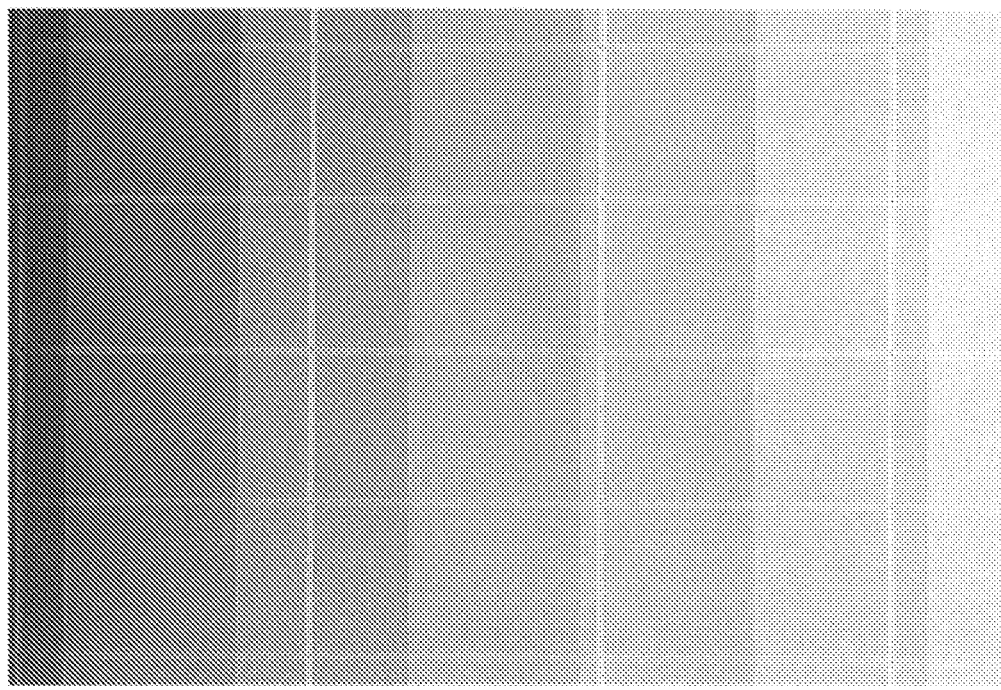
FIG. 7C is an image example for explaining sharpness adjustment in the image display device subsequent to FIG. 7B.

An image illustrated in FIG. 7B is an enlarged view of a part of an image illustrated in FIG. 7A when the sharpness is adjusted. Further, an image illustrated in FIG. 7C is an enlarged view of the same range when the sharpness of the image illustrated in FIG. 7B is adjusted again (second time). Thus, there arises a problem that the image is inappropriately displayed, for example, an edge of the image is emphasized as illustrated in FIG. 7C. Therefore, in computing unit 11, for an image whose sharpness has been adjusted by the image display device in the preceding stage, by limiting sharpness adjustment, it is possible to prevent the image from deteriorating.

In the adjusting processing, computing unit 11 performs the image adjustment using the parameter value set in the control processing.

Computing unit 11 causes display unit 14 to display the image data. When the image adjustment is performed, computing unit 11 causes display unit 14 to display the image data subjected to the image adjustment.

When receiving unit 15 receives the drawing data by the user, in the combining processing, computing unit 11 combines the received drawing data with the image data and displays the combined image data on display unit 14.

In a case where image display device 10 is connected to the image display device in the subsequent stage, in an addition processing, computing unit 11 generates accessory data including the information of the own device and the image adjustment information, adds the accessory data to the image data, and outputs the image data to the image display device in the subsequent stage via output unit 13. The information of the own device includes the type of the own device and/or the type of series of image display system 1 to which the own device belongs. Further, the information of the own device can include a size of display unit 14, specifically, the number of inches and/or the number of pixels of display unit 14. The image adjustment information can include the type of image adjustment performed on the image data and the parameter value used in each image adjustment.

For example, the accessory data may be included in a specific region of Infoframe used for transmission and reception of the HDMI signal. Specifically, the accessory data may be included in a specific region of Source Product Description of Infoframe. This Source Product Description is included in a region specified by Type Code 0×03 of Infoframe. For example, the accessory data may be included in Data Byte 1 to Data Byte 25 of the Source Product Description.

Processing performed in first image display device 10A that is the preceding stage of image display system 1 according to the first exemplary embodiment will be described with reference to a flowchart illustrated in FIG. 8. A series of processing illustrated in the flowchart of FIG. 8 is details of the processing of first image display device 10A illustrated in the sequence diagram of FIG. 3. In image display device 10A, the image data is input from image providing device 20 to input unit 12 (S101).

Computing unit 11 performs decoding processing of the image data input in step S101 (S102). Specifically, content of the accessory data received together with the image data is decoded in the decoding processing.

Subsequently, computing unit 11 performs the control processing of setting a parameter value used for the image adjustment according to the result of the decoding processing in step S102 (S103). Here, the image data input to first image display device 10A has not been subjected to the image adjustment in another image display device before. Therefore, computing unit 11 can set a parameter value for each item to be adjusted for all items of brightness, contrast, sharpness, gamma correction, black expansion, and white balance.

Computing unit 11 performs the adjusting processing of the image data input in step S101 using the parameter value set in the control processing in step S103 (S104). As described above, in first image display device 10A, since the image adjustment is not performed on the image data input in step S101, normal image adjustment can be performed.

Computing unit 11 causes display unit 14 to display the image data subjected to the image adjustment in step S104 (S105).

Computing unit 11 generates the accessory data including the information of the own device and the image adjustment information in step S104 (S106).

Output unit 13 outputs the image data to which the accessory data generated in step S106 is added to second image display device 10B in the subsequent stage (S107).

Thereafter, receiving unit 15 receives the drawing data from the user (S108).

Computing unit 11 performs the combining processing of combining the drawing data received in step S108 with the image data subjected to the image adjustment in step S104 to obtain the combined image data (S109).

Computing unit 11 causes display unit 14 to display the image data obtained by the combining processing in step S109 (S110).

Computing unit 11 generates the accessory data indicating the image adjustment information (S111).

Output unit 13 outputs the combined image data to which the accessory data generated in step S111 is added to second image display device 10B in the subsequent stage (S112).

As described above, first image display device 10A performs the image adjustment for the input image data and displays it on display unit 14, and displays the image data combined with the drawing data on display unit 14 when receiving the drawing data. Further, first image display device 10A adds the accessory data indicating the image adjustment information to the combined image data to be displayed on display unit 14, and outputs the combined image data to second image display device 10B in the subsequent stage.

Figure 9:
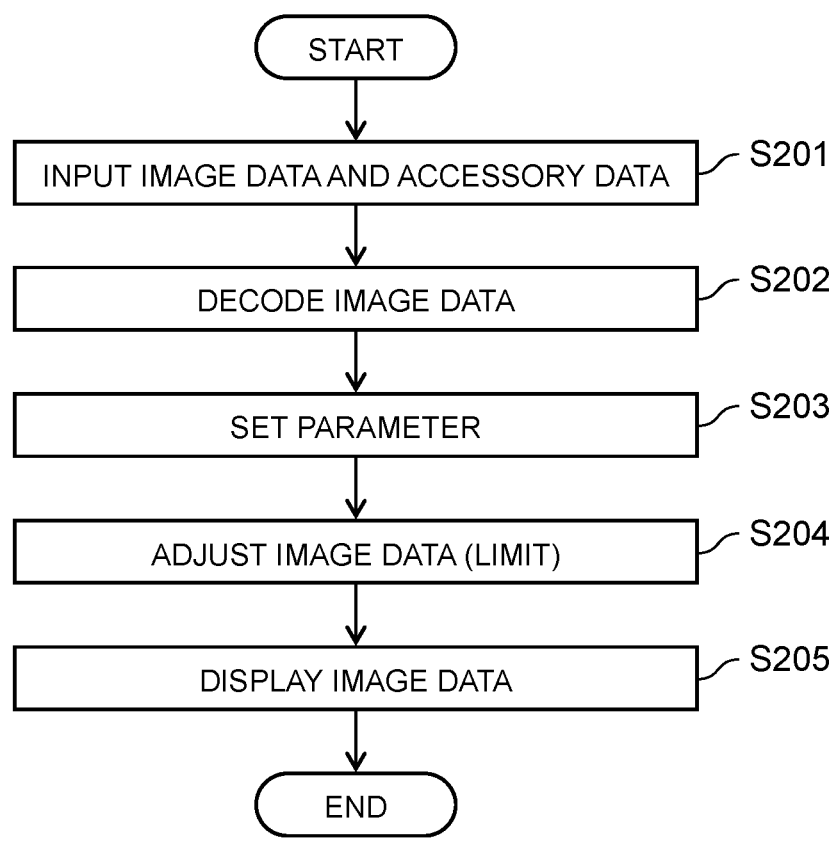
FIG. 9 is a flowchart illustrating image display processing in a second image display device according to the first exemplary embodiment.

Processing performed in second image display device 10B to which the image data output from first image display device 10A in the preceding stage is input as described above with reference to FIG. 8 will be described with reference to a flowchart illustrated in FIG. 9. A series of processing illustrated in the flowchart of FIG. 9 is details of the processing of the second image display device illustrated in the sequence diagram of FIG. 3. In second image display device 10B, the image data is input from first image display device 10A to input unit 12 (S201).

Computing unit 11 performs the decoding processing of the image data input in step S201 (S202). Specifically, content of the accessory data received together with the image data is decoded in the decoding processing.

Computing unit 11 performs the control processing of setting the parameter value used for the image adjustment according to the result of the decoding processing in step S202. Here, in a case where both of first image display device 10A in the preceding stage and second image display device 10B in the subsequent stage are of a predetermined type set in advance, and the image adjustment has already been performed in first image display device 10A as the main, an item parameter for limiting adjustment is set for an item having been performed in first image display device 10A as the main among brightness, contrast, sharpness, gamma correction, black expansion, and white balance (S203). Specifically, computing unit 11 sets parameter values that are not corrected for brightness, contrast, sharpness, gamma correction, and black expansion. Further, computing unit 11 sets the parameter value of the white balance in consideration of the parameter value of the white balance in first image display device 10A in the preceding stage. Note that, in a case where image data is input from an image display device other than the predetermined type, computing unit 11 sets parameter values for performing the image adjustment for all items.

Computing unit 11 performs the adjusting processing of the image data input in step S201 using the parameter value set in step S203 (S204).

Computing unit 11 causes display unit 14 to display the image data subjected to the image adjustment in step S204 (S205).

As described above, second image display device 10B omits the image adjustment and displays the image data already subjected to the image adjustment in first image display device 10A on display unit 14. Thus, it is possible to prevent a problem that image quality deteriorates due to double image adjustment.

Note that when the sub image display device is further connected to the subsequent stage of second image display device 10B that is the sub device, second image display device 10B generates the accessory data including the image adjustment information in which the image adjustment in the image display devices up to the previous stage and the image adjustment in the own device are combined, and transmits the accessory data to the image display device in the subsequent stage. Thus, even in the image display device in the subsequent stage, it is possible to prevent a problem that the image quality deteriorates due to a plurality of image adjustments.

Second Exemplary Embodiment

Also in the image display system according to a second exemplary embodiment, as described above with reference to FIG. 1A, image providing device 20 and first image display device 10A are connected, and first image display device 10A and second image display device 10B are connected. Therefore, the image display system according to the second exemplary embodiment will also be described with reference to FIG. 1A. In image display system 1 according to the first exemplary embodiment, the image data subjected to the image adjustment in first image display device 10A in the preceding stage is output to second image display device 10B in the subsequent stage, and the image adjustment in the preceding stage is considered in the image adjustment in second image display device 10B. In contrast, in image display system 1 according to the second exemplary embodiment, first image display device 10A in the preceding stage limits the image adjustment in consideration of connection in the subsequent stage, and the image adjustment is performed in second image display device 10B in the subsequent stage.

Figure 10:
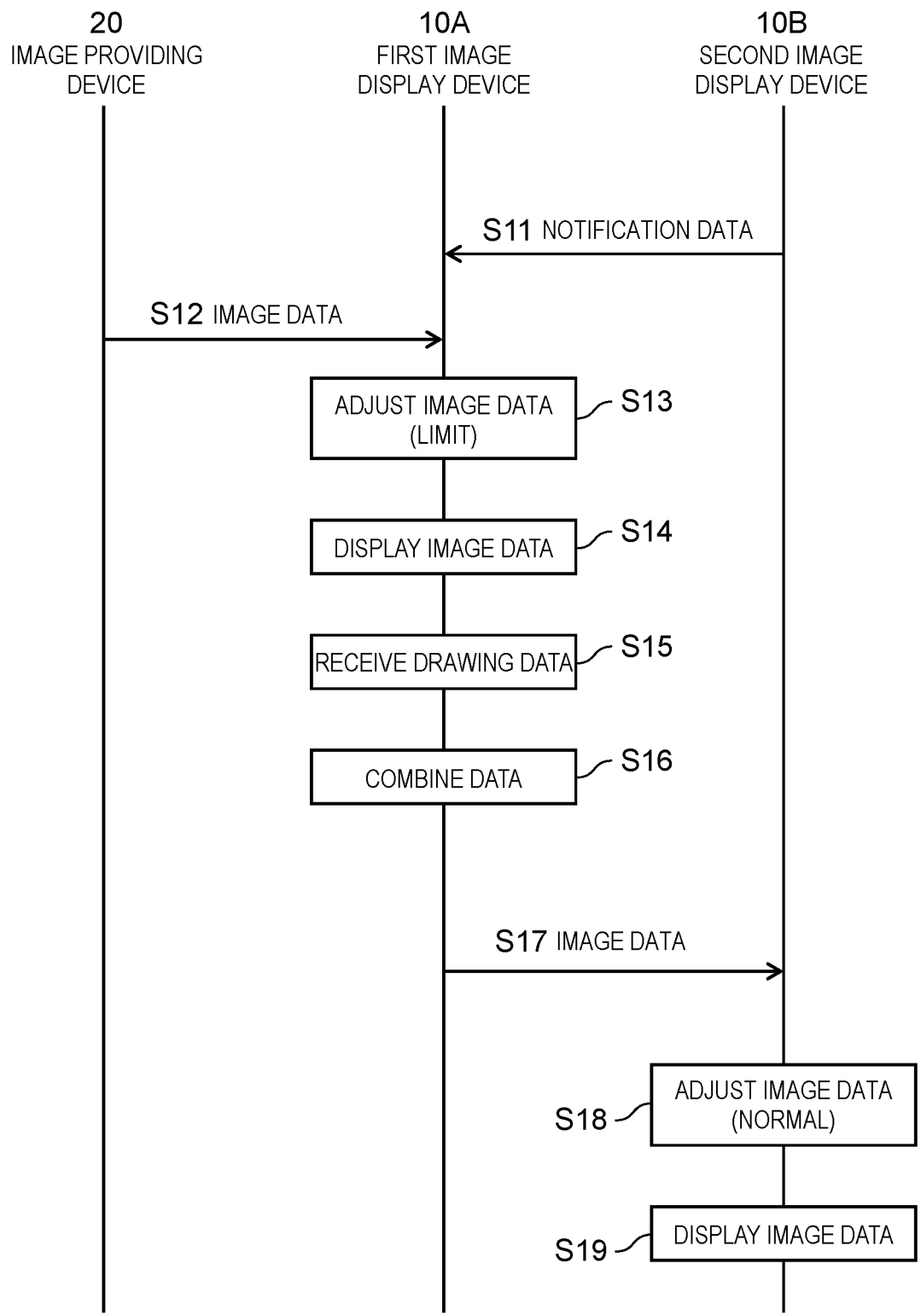
FIG. 10 is a sequence diagram illustrating processing in the image display system according to a second exemplary embodiment.

As illustrated in a sequence diagram of FIG. 10, second image display device 10B in the subsequent stage transmits notification data indicating the type of the own device to first image display device 10A in the preceding stage in advance (S11). Upon receiving the image data from image providing device 20 (S12), first image display device 10A in the preceding stage limits the image adjustment of the image data to be displayed on the own device and displays the image data (S13 and S14) in the case of outputting the image data to second image display device 10B in the subsequent stage. Further, upon receiving the drawing data (S15), first image display device 10A combines the drawing data with the image data (S16), and outputs the image data to second image display device 10B (S17). Second image display device 10B in the subsequent stage performs normal image adjustment on the image data and displays the image data (S18 and S19). That is, in the image display system according to the first exemplary embodiment, the image adjustment is performed in first image display device 10A in the preceding stage, and the image adjustment is limited in second image display device 10B in the subsequent stage. In contrast, the image display system according to the second exemplary embodiment is different in that the image adjustment is limited in first image display device 10A in the preceding stage, and the image adjustment is performed in second image display device 10B in the subsequent stage. This makes it possible to prevent the adverse effect on the image caused by the repeated image adjustment in the plurality of image display devices.

<<Image Display Device>>

Figure 11:
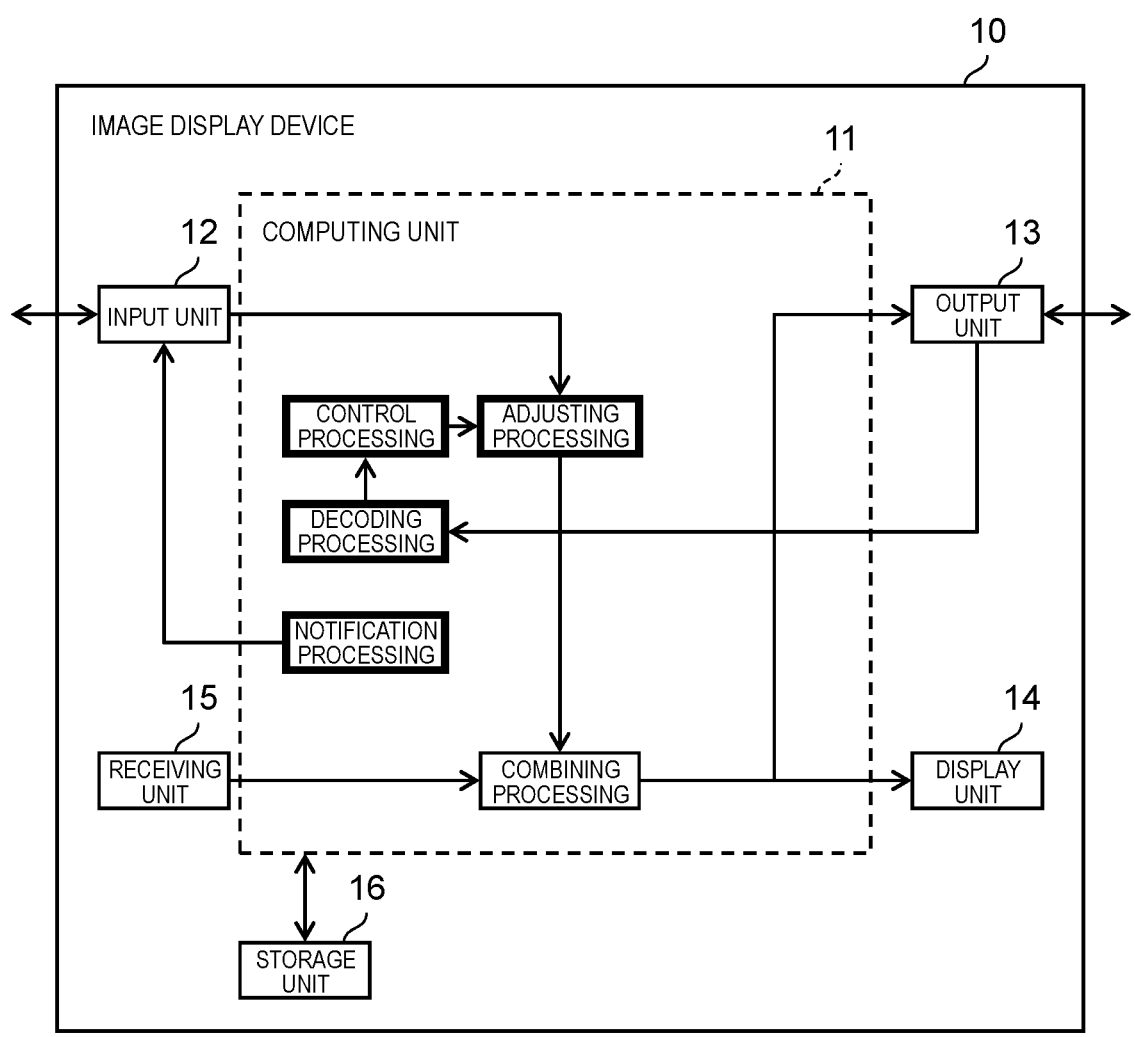
FIG. 11 is a block diagram illustrating a configuration of the image display device according to the second exemplary embodiment.

As illustrated in FIG. 11, similarly to image display device 10 described above with reference to FIG. 4, image display device 10 according to the second exemplary embodiment also includes computing unit 11, input unit 12, output unit 13, display unit 14, receiving unit 15, and storage unit 16, but is different in that a part of processing in computing unit 11 and the notification data are transmitted and received in input unit 12 and output unit 13. Specifically, computing unit 11 performs notification processing, decoding processing, control processing, adjusting processing, and combining processing, but processing other than the combining processing is different from the processing performed in image display device 10 according to the first exemplary embodiment.

In a case where another image display device is connected to the preceding stage, computing unit 11 generates the notification data including the information of the own device in the notification processing, and transmits the notification data to the image display device in the preceding stage via input unit 12. The information of the own device includes the type of the own device and/or the type of series of image display system 1 to which the own device belongs. Note that this notification data may be included in an EDID signal used for transmission and reception of the HDMI signal. For example, information included in a specific region of Monitor Descriptor Currently Mandatory of the EDID signal may be used as the notification data. Specifically, Product ID or Monitor Name may be used as the notification data.

Computing unit 11 decodes the notification data received by output unit 13 from the image display device in the subsequent stage in the decoding processing. Specifically, computing unit 11 determines whether the device of the predetermined type is connected to the subsequent stage by the decoding processing. As in the case described above, the "predetermined type" is a predetermined type such as the same or similar standard or series that can configure image display system 1 as first image display device 10A as the main or second image display device 10B as the sub.

In the control processing, computing unit 11 sets the parameter value for adjusting the image according to the result of the decoding processing, and controls the adjusting processing in the subsequent stage. For example, only when the predetermined type of image display device is not connected to the subsequent stage, computing unit 11 sets each parameter value of the image adjustment so that optimum image display is performed in the own device. On the other hand, when the predetermined type of image display device is connected to the subsequent stage, a parameter value for which specific image adjustment is not performed is set.

The specific image adjustment is, for example, adjustment related to the white balance of the image. Therefore, in a case where the image display device in the subsequent stage is connected, computing unit 11 displays the image data without adjusting the white balance. On the other hand, when the image adjustment of brightness, contrast, sharpness, gamma correction, and black expansion has been performed in the image display device in the preceding stage, computing unit 11 performs adjustment in the own device in consideration of the adjustment in the preceding stage.

In the adjusting processing, computing unit 11 performs the image adjustment using the parameter value set in the control processing.

Computing unit 11 causes display unit 14 to display the image data. For example, display unit 14 displays the image data subjected to the image adjustment by the adjusting processing.

When receiving unit 15 receives the drawing data by the user, in the combining processing, computing unit 11 combines the image data with the drawing data and displays the combined image data on display unit 14.

When image display device 10 needs to output image data to the device in the subsequent stage, computing unit 11 outputs the image data to the device in the subsequent stage via output unit 13.

Figure 12:
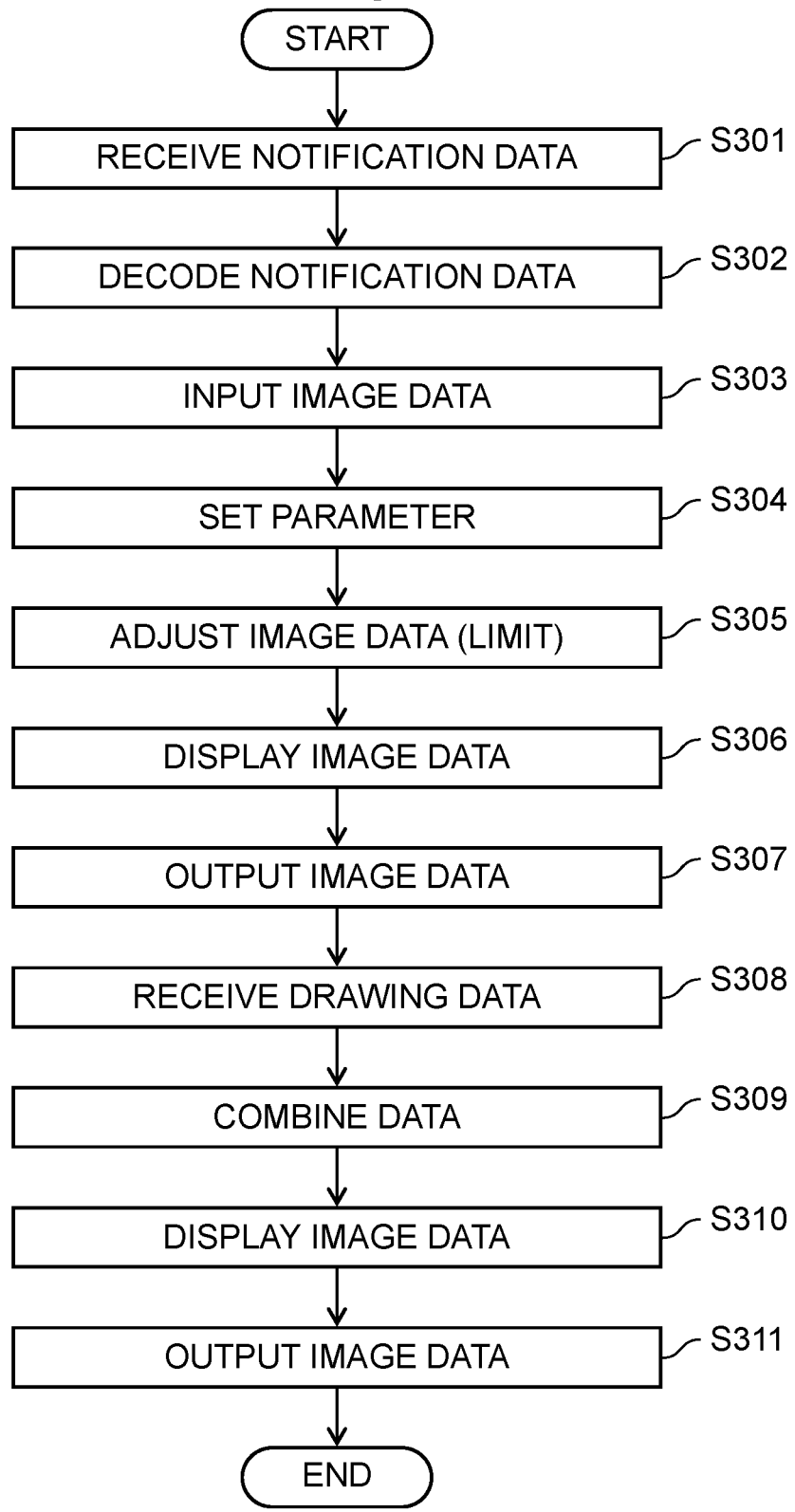
FIG. 12 is a flowchart illustrating image display processing in the first image display device according to the second exemplary embodiment.

The processing performed in first image display device 10A in the preceding stage of image display system 1 according to the second exemplary embodiment will be described with reference to a flowchart illustrated in FIG. 12. A series of processing illustrated in the flowchart of FIG. 12 is details of the processing of first image display device 10A illustrated in the sequence diagram of FIG. 10. In first image display device 10A, output unit 13 receives the notification data transmitted from the image processing device in the subsequent stage (S301).

Computing unit 11 performs the decoding processing of the notification data received in step S301 (S302). Specifically, computing unit 11 determines whether the predetermined type of image display device is connected to the subsequent stage.

Thereafter, the image data is input to input unit 12 (S303).

Subsequently, computing unit 11 performs the control processing of setting the parameter value used for the image adjustment according to the result of the decoding processing in step S302 (S304). Here, since first image display device 10A in the preceding stage is connected to second image display device 10B in the subsequent stage, the parameter value for which the specific image adjustment is not performed is set.

Computing unit 11 performs the adjusting processing of the image data input in step S303 using the parameter value set in step S304 (S305).

Computing unit 11 causes display unit 14 to display the image data subjected to the image adjustment in step S305 (S306).

Output unit 13 outputs the image data subjected to the image adjustment in step S305 to second image display device 10B in the subsequent stage (S307).

Thereafter, receiving unit 15 receives the drawing data from the user (S308).

Computing unit 11 performs the combining processing of combining the drawing data received in step S308 with the image data subjected to the image adjustment in step S305 to obtain the combined image data (S309).

Computing unit 11 causes display unit 14 to display the image data obtained by the combining processing in step S309 (S310).

Output unit 13 outputs the image data combined in step S309 to second image display device 10B in the subsequent stage (S311).

As described above, in a case where first image display device 10A is connected to second image display device 10B in the subsequent stage, first image display device 10A performs the image adjustment by partially limiting the input image data at the time of the image adjustment, displays the image data on display unit 14, and outputs the image data to second image display device 10B in the subsequent stage, and when the drawing data is received, first image display device 10A displays the image data combined with the drawing data on display unit 14 and outputs the image data to second image display device 10B in the subsequent stage.

Figure 13:
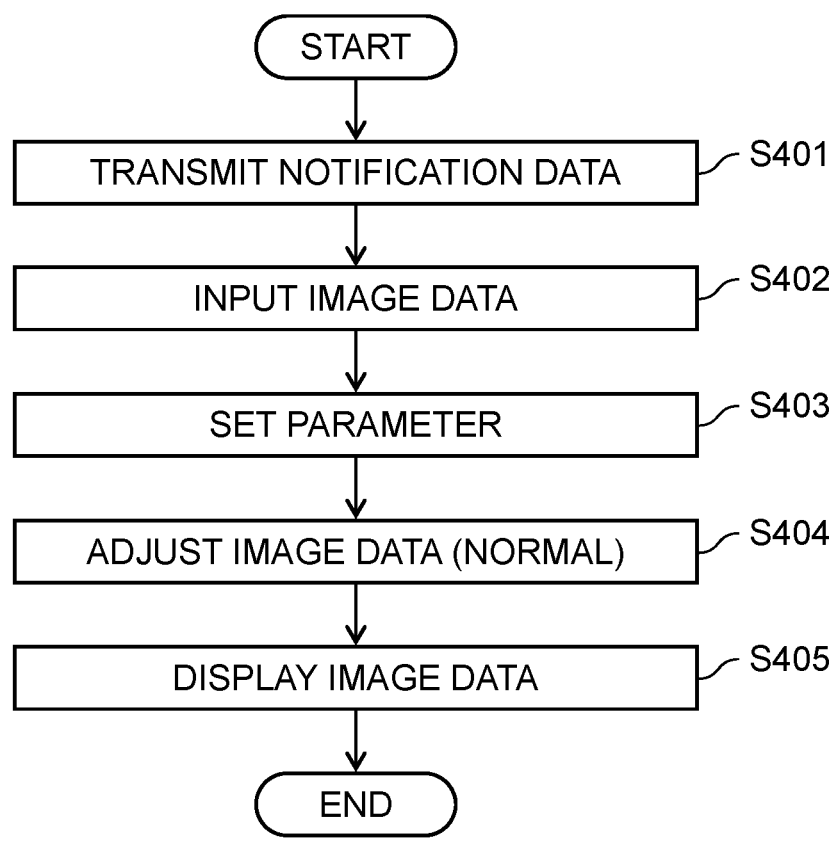
FIG. 13 is a flowchart illustrating image display processing in the second image display device according to the second exemplary embodiment.

The processing performed in second image display device 10B to which the image data output from first image display device 10A in the preceding stage is input as described above with reference to FIG. 12 will be described with reference to a flowchart illustrated in FIG. 13. A series of processing illustrated in the flowchart of FIG. 13 is details of the processing of the second image display device illustrated in the sequence diagram of FIG. 10. In second image display device 10B, computing unit 11 transmits the notification data to first image display device 10A in the preceding stage via input unit 12 by the notification processing (S401).

Thereafter, the image data is input to input unit 12 (S402).

Computing unit 11 performs the control processing of setting the parameter value used for the image adjustment (S403). Since second image display device 10B in the subsequent stage does not receive the notification data from the device in the subsequent stage and does not need to limit the image adjustment, second image display device 10B sets parameter values to be adjusted for all items of brightness, contrast, sharpness, gamma correction, black expansion, and white balance.

Computing unit 11 performs the adjusting processing of the image data input in step S402 using the parameter value set in step S403 (S404).

Computing unit 11 causes display unit 14 to display the image data subjected to the image adjustment in step S404 (S405).

As described above, second image display device 10B performs the image adjustment on the image data on which the image adjustment has not been performed in first image display device 10A, and displays the adjusted image data on display unit 14. Thus, it is possible to prevent the problem that image quality deteriorates due to the double image adjustment. Specifically, since it is difficult to remove white balance in a case where the white balance is adjusted, it is possible to prevent deterioration of the image in the subsequent stage by not adjusting the image in first image display device 10A in the preceding stage.

Note that when the sub image display device is further connected to the subsequent stage of second image display device 10B that is the sub device, second image display device 10B may transmit the image data to the image display device in the subsequent stage without performing the image adjustment for white balance in the same manner as first image display device 10A.

Third Exemplary Embodiment

Also in the image display system according to a third exemplary embodiment, as described above with reference to FIG. 1A, image providing device 20 and first image display device 10A are connected, and first image display device 10A and second image display device 10B are connected. Therefore, the image display system according to the third exemplary embodiment will also be described with reference to FIG. 1A. In image display systems 1 according to the first exemplary embodiment and the second exemplary embodiment described above, considering the image adjustment in one image display device 10, the image adjustment in another image display device 10 is limited. In contrast, in the image display system according to the third exemplary embodiment, the image adjustment is performed in each device in consideration of the image adjustment performed by another device.

Figure 14:
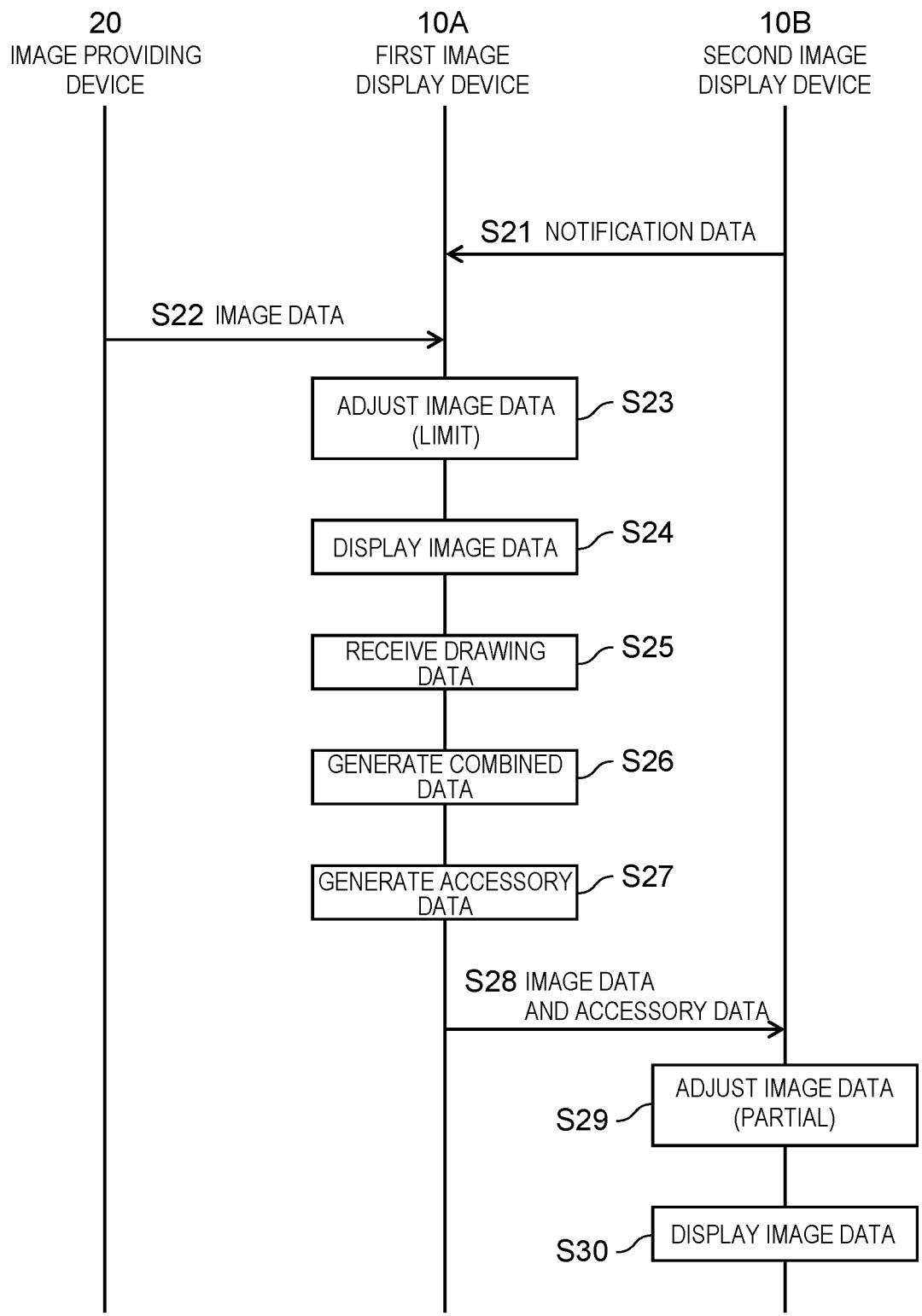
FIG. 14 is a sequence diagram illustrating processing in the image display system according to a third exemplary embodiment.

As illustrated in a sequence diagram of FIG. 14, second image display device 10B in the subsequent stage transmits the notification data indicating the type of the own device to first image display device 10A in the preceding stage in advance (S21). Upon receiving the image data from image providing device 20 (S22), first image display device 10A in the preceding stage performs the image adjustment by limiting some items of the image data to be displayed on the own device in the case of outputting the image data to second image display device 10B in the subsequent stage (S23). Specifically, first image display device 10A performs the image adjustment only for brightness, contrast, sharpness, gamma correction, and black expansion, and does not adjust white balance. First image display device 10A causes display unit 14 to display the image data adjusted in step S23 (S24). Further, upon receiving the drawing data (S25), first image display device 10A combines the image data adjusted in step S23 with the drawing data received in step S25 (S26). Thereafter, first image display device 10A generates the accessory data including the information of the own device and the image adjustment information (S27), adds the accessory data to the image data, and transmits the image data to second image display device 10B (S28).

Second image display device 10B in the subsequent stage performs the image adjustment on the image data according to the image adjustment information included in the accessory data (S29). Specifically, second image display device 10B does not perform the image adjustment for brightness, contrast, sharpness, gamma correction, and black expansion, and performs the image adjustment only for white balance that has not been adjusted. Further, second image display device 10B displays the image data subjected to the image adjustment in step S28 on display unit 14 (S30). That is, in the image display system according to the first exemplary embodiment, the image adjustment is performed without limiting any item in first image display device 10A in the preceding stage, and the image adjustment is limited only in second image display device 10B in the subsequent stage. In contrast, the image display system according to the third exemplary embodiment is different in that the image adjustment of some items is performed in first image display device 10A in the preceding stage, and in second image display device 10B in the subsequent stage, the item for which the image adjustment has been performed in first image display device 10A in the preceding stage is limited, and the image adjustment of another item for which the image adjustment has been limited is performed. This makes it possible to prevent the adverse effect on the image caused by the repeated image adjustment for the same item in second image display device 10B.

<<Image Display Device>>

Figure 15:
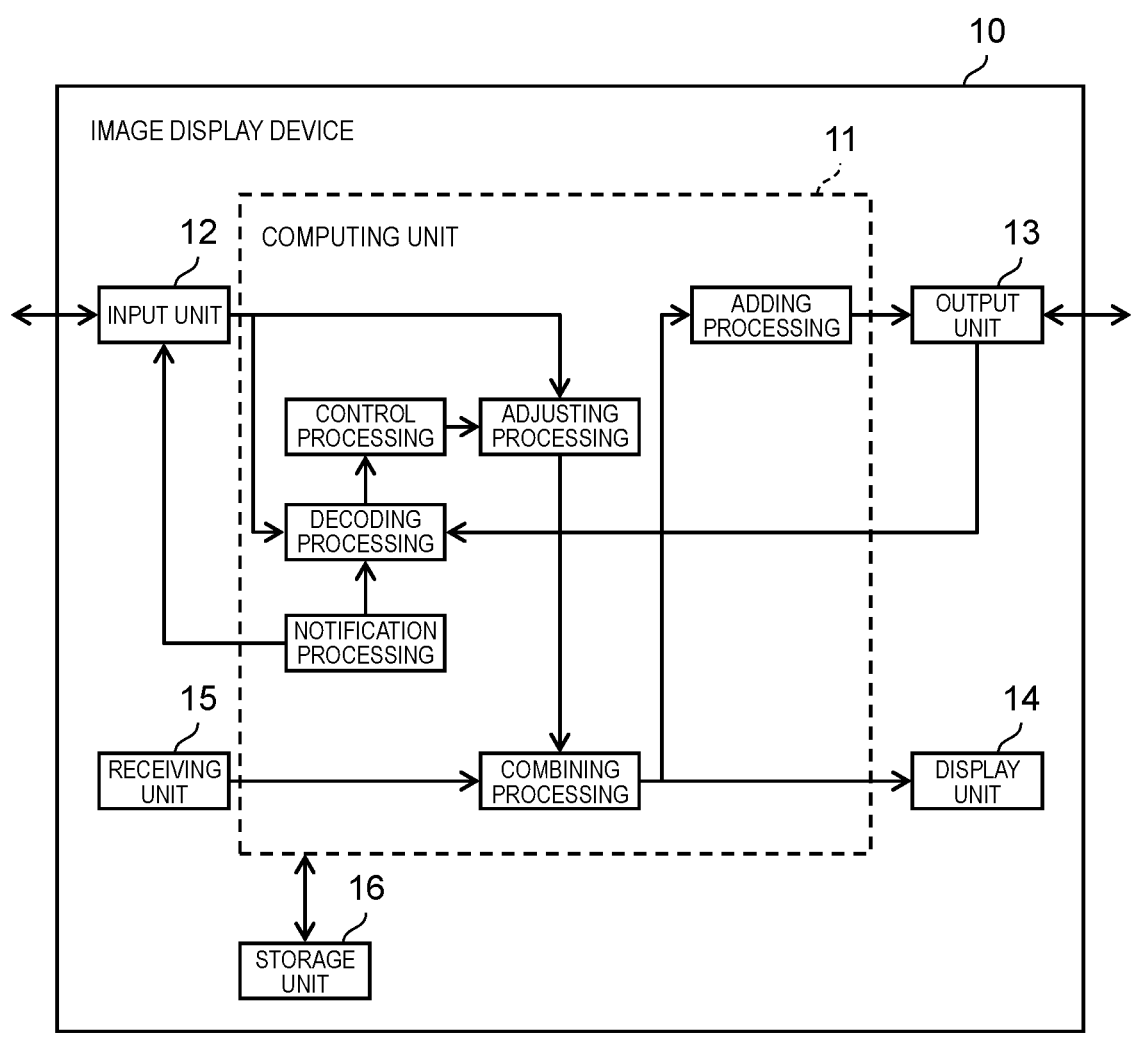
FIG. 15 is a block diagram illustrating a configuration of the image display device according to the third exemplary embodiment.

As illustrated in FIG. 15, similarly to image display device 10 described above with reference to FIGS. 4 and 11, image display device 10 according to the third exemplary embodiment also includes computing unit 11, input unit 12, output unit 13, display unit 14, receiving unit 15, and storage unit 16. Computing unit 11 performs the notification processing, the decoding processing, the control processing, the adjusting processing, the combining processing, and an adding processing, some of them are the same as the processing performed in image display device 10 according to the first exemplary embodiment described above with reference to FIG. 4, and some of them are the same as the processing performed in image display device 10 according to the second exemplary embodiment described above with reference to FIG. 11.

In the notification processing, computing unit 11 generates the notification data including the information of the own device, and transmits the notification data to the image display device in the preceding stage via input unit 12.

When input unit 12 receives the accessory data from the image display device in the preceding stage, computing unit 11 decodes the accessory data in the decoding processing. Further, when output unit 13 receives the notification data from the image display device in the subsequent stage, computing unit 11 decodes the notification data in the decoding processing.

In the control processing, computing unit 11 sets a parameter value for adjusting the image according to a result of the decoding processing, and controls the adjusting processing in the subsequent stage. For example, in the notification data received from the image display device in the subsequent stage, when it is decoded that the predetermined type of image display device is connected to the subsequent stage, computing unit 11 performs only specific image adjustment, specifically, brightness, contrast, sharpness, gamma correction, and black expansion, and sets a parameter value that is not adjusted for white balance. Further, in the accessory data, when it is decoded that the predetermined type of image display device is connected to the preceding stage, computing unit 11 does not perform the specific image adjustment, specifically, brightness, contrast, sharpness, gamma correction, and black expansion of the image, and adjusts white balance.

In the adjusting processing, computing unit 11 performs the image adjustment using the parameter value set in the control processing.

Computing unit 11 causes display unit 14 to display the image data. For example, display unit 14 displays the image data subjected to the image adjustment by the adjusting processing.

When receiving unit 15 receives the drawing data by the user, in the combining processing, computing unit 11 combines the image data with the drawing data and displays the combined image data on display unit 14.

When image display device 10 needs to output the image data to the image display device in the subsequent stage, computing unit 11 outputs the image data to the image display device in the subsequent stage via output unit 13.

Figure 16:
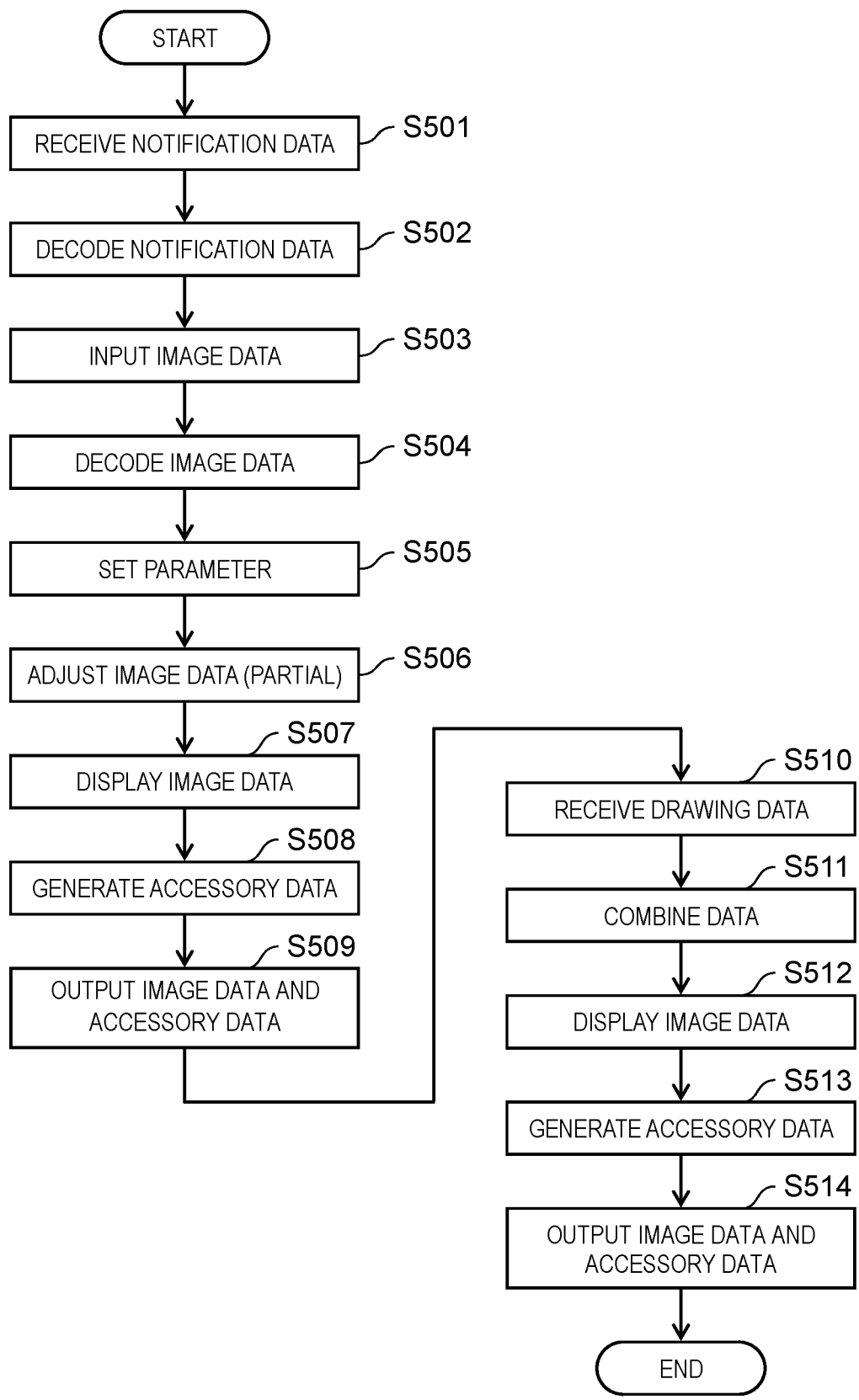
FIG. 16 is a flowchart illustrating image display processing in the first image display device according to the third exemplary embodiment.

The processing performed in first image display device 10A in the preceding stage of image display system 1 according to the third exemplary embodiment will be described with reference to a flowchart illustrated in FIG. 16. A series of processing illustrated in the flowchart of FIG. 16 is details of the processing of first image display device 10A illustrated in the sequence diagram of FIG. 14. In first image display device 10A, output unit 13 receives the notification data transmitted from the image processing device in the subsequent stage (S501).

Computing unit 11 performs the decoding processing of the notification data received in step S501 (S502). Specifically, computing unit 11 determines whether the predetermined type of image display device is connected to the subsequent stage.

Thereafter, the image data is input to input unit 12 (S503).

Subsequently, computing unit 11 performs the decoding processing of the image data input in step S503 (S504). Specifically, content of the accessory data received together with the image data is decoded in the decoding processing.

Subsequently, computing unit 11 performs the control processing of setting the parameter used for the image adjustment according to the result of the decoding processing in steps S502 and S504 (S505). Here, since first image display device 10A in the preceding stage is connected to second image display device 10B in the subsequent stage, the parameters are set in which only some image adjustment is performed and other image adjustment is not performed. Specifically, the parameters are set in which only brightness, contrast, sharpness, gamma correction, and black expansion are adjusted, and white balance is not adjusted.

Computing unit 11 performs the adjusting processing of the image data input in step S503 using the parameter set in step S505 (S506).

Computing unit 11 causes display unit 14 to display the image data subjected to the image adjustment in step S506 (S507).

Computing unit 11 generates the accessory data including the information of the own device and the image adjustment information in step S506 (S508).

Output unit 13 outputs the image data to which the accessory data generated in step S508 is added to second image display device 10B in the subsequent stage (S509).

Thereafter, receiving unit 15 receives the drawing data from the user (S510).

Computing unit 11 performs the combining processing of combining the drawing data received in step S509 with the image data subjected to the image adjustment in step S506 to obtain the combined image data (S511).

Computing unit 11 causes display unit 14 to display the image data obtained by the combining processing in step S511 (S512).

Computing unit 11 generates the accessory data indicating the image adjustment information (S513).

Output unit 13 outputs the combined image data to which the accessory data generated in step S513 is added to second image display device 10B in the subsequent stage (S514).

As described above, in the case where first image display device 10A is connected to second image display device 10B in the subsequent stage, first image display device 10A performs the image adjustment by partially limiting the input image data at the time of the image adjustment, displays the image data on display unit 14, and outputs the image data to second image display device 10B in the subsequent stage.

Figure 17:
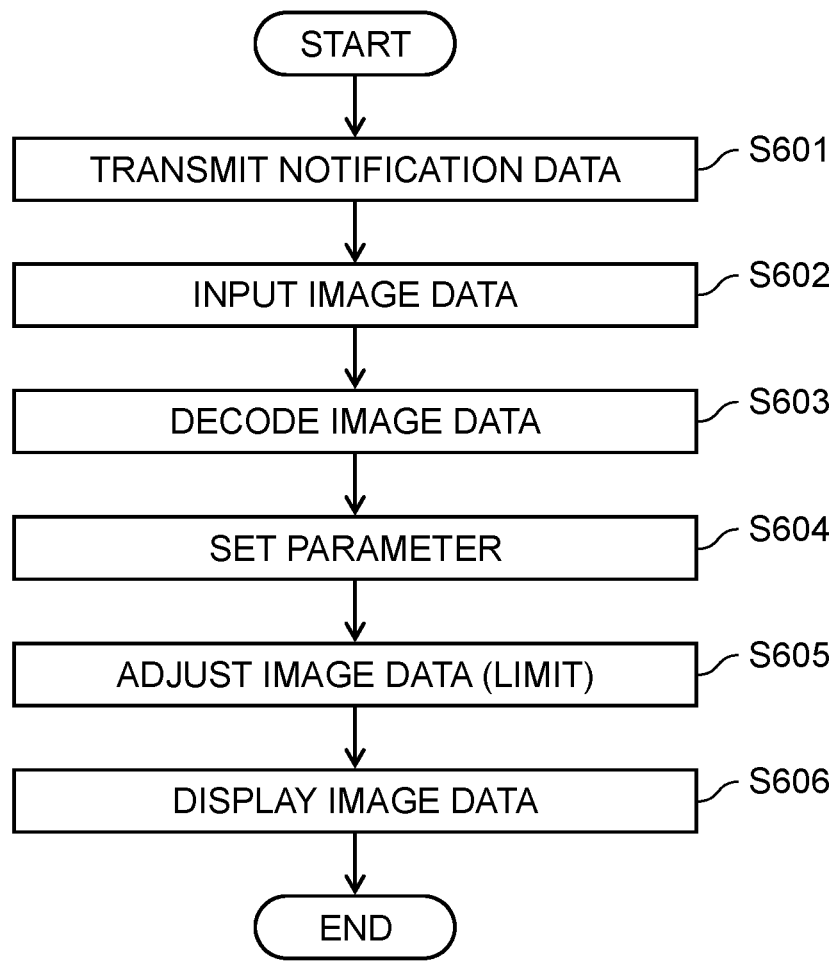
FIG. 17 is a flowchart illustrating image display processing in the second image display device according to the third exemplary embodiment.

The processing performed in second image display device 10B to which the image data output from first image display device 10A in the preceding stage is input as described above with reference to FIG. 16 will be described with reference to a flowchart illustrated in FIG. 17. A series of processing illustrated in the flowchart of FIG. 17 is details of the processing of the second image display device illustrated in the sequence diagram of FIG. 14. In second image display device 10B, computing unit 11 transmits the notification data to first image display device 10A in the preceding stage via input unit 12 by the notification processing (S601).

Thereafter, the image data is input to input unit 12 (S602).

Computing unit 11 performs the decoding processing of the image data input in step S602 (S603). Specifically, content of the accessory data received together with the image data is decoded in the decoding processing.

Computing unit 11 performs the control processing of setting the parameter used for the image adjustment (S604). Since brightness, contrast, sharpness, gamma correction, and black expansion of the image data has been adjusted in first image display device 10A, second image display device 10B in the subsequent stage sets parameters for which brightness, contrast, sharpness, gamma correction, and black expansion are not adjusted. In addition, since the white balance is not adjusted by first image display device 10A in the preceding stage, a parameter for adjusting the white balance is set.

Computing unit 11 performs the adjusting processing of the image data input in step S402 using the parameter set in step S604 (S605).

Computing unit 11 causes display unit 14 to display the image data subjected to the image adjustment in step S605 (S606).

As described above, second image display device 10B performs the image adjustment only for the item that has not been adjusted in first image display device 10A, and displays the adjusted image data on display unit 14. Thus, it is possible to prevent the problem that image quality deteriorates due to the double image adjustment.

Note that when the sub image display device is further connected to the subsequent stage of second image display device 10B that is the sub device, second image display device 10B may transmit the image data to the image display device in the subsequent stage without performing the image adjustment for a specific item in the same manner as first image display device 10A.

Overview of Exemplary Embodiments (1) An image display device of the first present disclosure includes an input unit that receives image data, a display unit that displays the image data received by the input unit, a receiving unit that receives drawing data drawn on the image data displayed on the display unit, an output unit that outputs the image data to another device, and a computing unit. The computing unit performs specific image adjustment on the image data, and when the specific image adjustment has been performed on the image data input to the input unit, the computing unit causes the display unit to display the image data without performing the specific image adjustment on the image data.

This makes it possible to prevent image deterioration due to repetition of the same image adjustment.

(2) In the above (1), the computing unit may determine that the image data has been subjected to the specific image adjustment when accessory data including information indicating the specific image adjustment is input together with the image data in the input unit.

This makes it possible to prevent image deterioration due to repetition of the same image adjustment.

(3) In the above (2), when the specific image adjustment has not been performed on the image data input to the input unit, the computing unit performs the specific image adjustment on the image data, causes the display unit to display the image data, outputs the image data subjected to the specific image adjustment to the output unit together with the accessory data including the information indicating the specific image adjustment, and causes the output unit to output the image data to the other device.

This makes it possible to perform necessary image adjustment while preventing the image deterioration due to the repetition of the same image adjustment.

(4) In the above (3), the computing unit generates the accessory data including type information of the image display device together with the information indicating the specific image adjustment, and when the image data has been subjected to the specific image adjustment by a device of a predetermined type, the computing unit causes the display unit to display the image data without performing the specific image adjustment on the image data.

This makes it possible to prevent the image deterioration due to the repetition of the same image adjustment by the same type of image display device.

(5) The specific image adjustment of the above (1) to (4) may be an adjustment related to at least one of brightness, contrast, sharpness, gamma correction, or black expansion of an image.

This makes it possible to prevent image deterioration due to repetition of the same image adjustment.

(6) An image display device of the second present disclosure includes: an input unit that receives image data; a display unit that displays the image data received by the input unit; a receiving unit that receives drawing data drawn on the image data displayed on the display unit; an output unit that outputs the image data to another device; and a computing unit. When notification data from the other device is detected, the computing unit causes the display unit to display the image data input to the input unit without performing specific image adjustment that is normally performed, generates combined image data obtained by combining the image data with the drawing data received by the receiving unit, outputs the combined image data to the output unit, and causes the output unit to output the combined image data to the other device, and when the notification data from the other device is not detected, the computing unit performs the specific image adjustment on the image data input to the input unit and causes the display unit to display the image data.

This makes it possible to prevent image deterioration due to repetition of the same image adjustment.

(7) The specific image adjustment of the above (6) may be an adjustment related to white balance of an image.

This makes it possible to prevent the image deterioration due to the repetition of the adjustment of the white balance.

(8) An image display device of the third present disclosure includes: the input unit that receives image data; the display unit that displays the image data received by the input unit; the receiving unit that receives drawing data drawn on the image data displayed on the display unit; the output unit that outputs the image data to another device; and the computing unit. When notification data from the other device is detected and the accessory data input together with the image data input to the input unit does not include information indicating second image adjustment, the computing unit does not perform first image adjustment on the image data input to the input unit but performs the second image adjustment on the image data, causes the display unit to display the image data, generates combined image data obtained by combining the image data with the drawing data received by the receiving unit, outputs the combined image data to the output unit together with the accessory data including type information of the image display device and information indicating the second image adjustment, and causes the output unit to output the combined image data to the other device, and when the notification data from the other device is not detected and the accessory data input together with the image data input to the input unit includes information indicating second image adjustment, the computing unit does not perform the second image adjustment, and causes the display unit to display the image data subjected to the first image adjustment.

This makes it possible to prevent image deterioration due to repetition of the same image adjustment.

(9) The first image adjustment of the above (8) may be an adjustment related to white balance, and the second image adjustment may be an adjustment related to at least one of brightness, contrast, sharpness, gamma correction, or black expansion of an image.

This makes it possible to prevent image deterioration due to repetition of the same image adjustment.

(10) The image data of the above (2), (3), (4), (8), or (9), that is input to the input unit and output to the output unit may be an HDMI signal, and the accessory data may be included in a specific region of Infoframe used for transmission and reception of the HDMI signal.

This makes it possible to prevent the image deterioration by using transmission and reception of a signal used in a normal HDMI signal.

(11) The accessory data of the above (10) may be included in a specific region of Source Product Description of Infoframe.

This makes it possible to prevent the image deterioration by using transmission and reception of a signal used in a normal HDMI signal.

(12) The notification data of any one of the above (6) to (9) may be included in an EDID signal.

This makes it possible to prevent the image deterioration by using transmission and reception of a signal used in a normal HDMI signal.

(13) The notification data of the above (12) may be included in a specific region of Monitor Descriptor Currently Mandatory of the EDID signal.

This makes it possible to prevent the image deterioration by using transmission and reception of a signal used in a normal HDMI signal.

(14) An image display method of the present disclosure is an image display method performed by an image display device that receives image data, causes a display unit to display the image data received, receives drawing data drawn on the image data displayed on the display unit, and outputs the image data to another device, and when specific image adjustment has been performed on the image data input, the image display method may cause the display unit to display the image data without performing the specific image adjustment on the image data.

This makes it possible to prevent image deterioration due to repetition of the same image adjustment.

(15) In the above (14), when accessory data including information indicating the specific image adjustment is input together with the image data, the image display method may determine that the image data has been subjected to the specific image adjustment.

This makes it possible to prevent image deterioration due to repetition of the same image adjustment.

(16) In the above (15), when the specific image adjustment has not been performed on the image data input, the image display method may perform the specific image adjustment on the image data, cause the display unit to display the image data, and output the image data subjected to the specific image adjustment to the other device together with the accessory data including the information indicating the specific image adjustment.

This makes it possible to prevent image deterioration due to repetition of the same image adjustment.

The image display device and the image display method described in all claims of the present disclosure are achieved by hardware resources, for example, cooperation with a processor, a memory, and a computer program.

The image display device, the image display method, and the computer program of the present disclosure are useful for achieving appropriate image adjustment in image display.

What is claimed is:

1. An image display method performed by an image display device, comprising:
receiving image data;
causing a display unit to display the image data received;
receiving drawing data drawn on the image data displayed on the display unit;
performing specific image adjustment on the image data to obtain adjustment image data;
combining the drawing data with the adjustment image data to obtain combined image data;
outputting the combined image data and an accessory data including an image adjustment information to another device;
receiving the combined image data and the accessory data at the another device; and
performing specific image adjustment about a parameter not contained in the accessory data on the combined image data received at the another device.

2. The image display method according to claim 1, further comprising when the accessory data including information indicating the specific image adjustment is received together with the image data, determining that the image data has been subjected to the specific image adjustment.

3. A non-transitory storage medium that stores a computer program causing the image display device to perform the image display method according to claim 1.

4. An image display system, comprising:
a first display device, and
a second display device, wherein
the first display device includes:
a first input unit that receives image data;
a first display unit that displays the image data received by the first input unit;
a first receiving unit that receives drawing data drawn on the image data displayed on the first display unit;
a first output unit that outputs the image data including the drawing data drawn on the image data to the second display device; and
a first computing unit;
the second display device includes;
a second input unit that receives the image data including the drawing data drawn on the image data;
a second display unit that displays the image data received by the second input unit; and
a second computing unit,
the first computing unit performs specific image adjustment on the image data to obtain adjustment image data, and combines the drawing data received by the first receiving unit with the adjustment image data to obtain combined image data,
the first output unit outputs the combined image data and an accessory data including an image adjustment information to the second display device, and
the second computing unit performs specific image adjustment about a parameter not contained in the accessory data on the combined image data output from the first output unit and received at the second input unit.

5. The image display system according to claim 4, wherein the specific image adjustment is an adjustment related to at least one of brightness, contrast, sharpness, gamma correction, or black expansion of an image.

6. The image display system according to claim 4, wherein the image data is an HDMI signal, and the accessory data is included in a specific region of Infoframe used for transmission and reception of the HDMI signal.

7. The image display system according to claim 6, wherein the accessory data is included in a specific region of Source Product Description of the Infoframe.

8. The image display system according to claim 4, wherein not performing specific image adjustment about a parameter contained in the accessory data on the combined image data received at the another device.

9. The image display system according to claim 4, wherein
the second computing unit doesn't perform specific image adjustment about a parameter contained in the accessory data on the combined image data output from the first output unit and received at the second input unit.

* * * * *